(12) United States Patent
Ishii

(10) Patent No.: US 8,750,216 B2
(45) Date of Patent: Jun. 10, 2014

(54) RECEIVING APPARATUS AND DATA OBTAINING METHOD

(71) Applicant: Hiroyuki Ishii, Yokosuka (JP)

(72) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/674,610

(22) Filed: Nov. 12, 2012

(65) Prior Publication Data

US 2013/0064184 A1 Mar. 14, 2013

Related U.S. Application Data

(62) Division of application No. 12/672,439, filed as application No. PCT/JP2008/064112 on Aug. 6, 2008.

(30) Foreign Application Priority Data

Aug. 14, 2007 (JP) ................................. 2007-211590

(51) Int. Cl.
*H04W 88/02* (2009.01)

(52) U.S. Cl.
USPC .......... 370/328; 370/252; 370/310; 455/67.11

(58) Field of Classification Search
USPC ................ 370/310, 328, 252; 455/67.11, 436
See application file for complete search history.

(56) References Cited

U.S. PATENT DOCUMENTS

| | | | |
|---|---|---|---|
| 6,522,888 B1 | 2/2003 | Garceran et al. | |
| 7,298,692 B2 | 11/2007 | Hiramatsu et al. | |
| 7,609,661 B2 * | 10/2009 | Chae et al. | 370/310 |
| 7,649,831 B2 | 1/2010 | Van Rensburg et al. | |
| 8,249,514 B2 | 8/2012 | Kashiwase | |
| 8,270,514 B2 | 9/2012 | To et al. | |
| 8,280,377 B2 * | 10/2012 | Lee et al. | 455/436 |
| 2003/0053413 A1 | 3/2003 | Sawahashi et al. | |
| 2003/0147358 A1 | 8/2003 | Hiramatsu et al. | |
| 2004/0091026 A1 | 5/2004 | Nakayama | |
| 2004/0105382 A1 | 6/2004 | Miyoshi et al. | |
| 2005/0255819 A1 | 11/2005 | Kawamoto et al. | |
| 2006/0007883 A1 | 1/2006 | Tong et al. | |
| 2006/0007890 A1 | 1/2006 | Yokoyama | |
| 2006/0067384 A1 | 3/2006 | Zhang et al. | |
| 2006/0172704 A1 | 8/2006 | Nishio et al. | |

(Continued)

FOREIGN PATENT DOCUMENTS

| | | |
|---|---|---|
| CN | 1463563 A | 12/2003 |
| EP | 1 965 509 | 9/2008 |

(Continued)

OTHER PUBLICATIONS

Patent Abstracts of Japan, Publication No. 2007-074159, dated Mar. 22, 2007, 1 page.

(Continued)

*Primary Examiner* — Michael Thier
*Assistant Examiner* — Vincelas Louis
(74) *Attorney, Agent, or Firm* — Osha Liang LLP

(57) ABSTRACT

A receiving apparatus for communication area evaluation includes a receiving unit configured to receive a first signal transmitted from a base station; a delay profile calculation unit configured to calculate a downlink delay profile based on the first signal; and an estimated value calculation unit configured to calculate an estimated cyclic prefix length based on the calculated downlink delay profile.

7 Claims, 19 Drawing Sheets

(56) References Cited

U.S. PATENT DOCUMENTS

| | | |
|---|---|---|
| 2006/0199544 A1 | 9/2006 | Ramakrishna et al. |
| 2006/0256761 A1 | 11/2006 | Meylan et al. |
| 2006/0258303 A1 | 11/2006 | Taira et al. |
| 2007/0047552 A1 | 3/2007 | Astely |
| 2007/0098098 A1 | 5/2007 | Xiao et al. |
| 2008/0117999 A1 | 5/2008 | Kadous et al. |
| 2008/0167041 A1* | 7/2008 | Wang et al. ............... 455/436 |
| 2008/0253300 A1 | 10/2008 | Wakabayashi et al. |
| 2010/0067491 A1* | 3/2010 | Park et al. ................. 370/332 |
| 2011/0081868 A1* | 4/2011 | Kim et al. ................ 455/67.11 |

FOREIGN PATENT DOCUMENTS

| | | |
|---|---|---|
| JP | 2001-024577 | 1/2001 |
| JP | 2001-274773 | 10/2001 |
| JP | 2002-300644 A | 10/2002 |
| JP | 2005-159420 A | 6/2005 |
| JP | 2007-074159 A | 3/2007 |
| JP | 2007-116571 A | 5/2007 |
| JP | 2007-134993 A | 5/2007 |
| WO | 2004/095730 A1 | 11/2004 |
| WO | 2006/055718 | 5/2006 |
| WO | 2006/075732 A1 | 7/2006 |
| WO | 2006/114873 | 11/2006 |
| WO | 2006/138555 A2 | 12/2006 |
| WO | 2007/072822 | 6/2007 |

OTHER PUBLICATIONS

Ericsson, "RSRP/E-UTRA carrier RSSI for Mobility Support in E-UTRAN," 3GPP TSG-RAN WG1 #48bis, R1-071598, Mar. 30, 2007, 5 pages.
Patent Abstracts of Japan, Publication No. 2001-274773, dated Oct. 5, 2001, 1 page.
Patent Abstracts of Japan, Publication No. 2001-024577, dated Jan. 26, 2001, 1 page.
3GPP TR 25.814 V7.0.0, Jun. 2006, "Physical Layer Aspects for Evolved Universal Terrestrial Radio Access (UTRA)," 126 pages.
3GPP TS 36.211 V1.0.0, Mar. 2007, "Physical Channels and Modulation," 30 pages.
3GPP TS 36.214 V1.0.0, May 2007, "Physical layer—Measurements," 8 pages.
International Search Report issued in PCT/JP2008/064112, mailed on Nov. 18, 2008, with translation, 13 pages.
Written Opinion issued in PCT/JP2008/064112, mailed on Nov. 18, 2008, 7 pages.
Chinese Office Action for Application No. 200880103141.9, mailed on Dec. 4, 2012 (14 pages).
esp@cenet Patent Abstract for Chinese Publication No. 1463563, publication date Dec. 24, 2003. (2 pages).
Office Action issued in related U.S. Appl. No. 13/674,588, mailed Oct. 24, 2013 (34 pages).
Office Action issued in related Japanese Application No. 2012-157285, mailed Jul. 30, 2013 (8 pages).

* cited by examiner

RECEIVING APPARATUS AND DATA OBTAINING METHOD

CROSS-REFERENCE TO RELATED APPLCIATIONS

The present application is a divisional application of and, thereby, claims benefit under 35 U.S.C. §120 U.S. patent application Ser. No. 12/672,439 filed on Feb. 5, 2010, titled, "RECEIVING APPARATUS AND DATA OBTAINING METHOD," which is a national stage application of PCT Application No. PCT/JP2008/064112, filed on Aug. 6, 2008, which claims priority to Japanese Patent Application No. 2007-211590 filed on Aug. 14, 2007. The content of the priority application is incorporated by reference in its entirety.

TECHNICAL FIELD

The present invention generally relates to a receiving apparatus. More particularly, the present invention relates to a receiving apparatus and a data obtaining method for obtaining information regarding a mobile communication system.

BACKGROUND ART

In a mobile communication system, communication quality in radio communications greatly influences transmission characteristics and quality of service. To improve the transmission characteristics and to maintain sufficient quality of service, network operators evaluate communication quality in their communication areas and try to improve the communication quality by adjusting various parameters. Here, "communication quality" is represented, for example, by a delay profile or a received signal-to-interference ratio (SIR).

For a CDMA-based mobile communication system, Japanese Patent Application Publication No. 11-193699, for example, discloses a service area evaluation system and a method and an apparatus for obtaining service area evaluation data used for evaluation of communication quality in a communication area. In CDMA, generally, dedicated channels are used for communications and transmission power control is used for link adaptation, a technology for adapting to fluctuations in reception levels such as Rayleigh fading and shadow fading.

Meanwhile, a successor communication system to W-CDMA, i.e., Long Term Evolution (LTE), is currently being discussed by 3GPP, a standardization group for W-CDMA. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

OFDM is a multi-carrier transmission method where a frequency band is divided into multiple narrow frequency bands (subcarriers) and data are transmitted on the subcarriers. The subcarriers are densely arranged along the frequency axis such that they partly overlap each other but do not interfere with each other. This method enables high-speed transmission and improves frequency efficiency.

SC-FDMA is a single-carrier transmission method where a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

In a mobile communication system based on LTE, shared channels are used for both uplink and downlink, and adaptive modulation and coding (AMC) is used for link adaptation.

DISCLOSURE OF INVENTION

Problems to be Solved by the Invention

As described above, a mobile communication system based on LTE uses OFDM and SC-FDMA that are different from communication methods used in a CDMA-based mobile communication system. Also, while a CDMA-based mobile communication system uses transmission power control for link adaptation and dedicated channels for communications, a mobile communication system based on LTE uses adaptive modulation and coding for link adaptation and shared channels for communications. Therefore, for a mobile communication system based on LTE, it is not possible to use, without change, a receiving method and a receiving apparatus for service (communication) area evaluation as disclosed in Japanese Patent Application Publication No. 11-193699

One object of the present invention is to provide a receiving apparatus and a data obtaining method that make it possible to evaluate communication quality in a communication area of a mobile communication system employing OFDM and SC-FDMA, adaptive modulation and coding, and/or shared channels.

Means for Solving the Problems

According to an aspect of the present invention, a receiving apparatus includes a receiving unit configured to receive a first signal transmitted from a base station; a delay profile calculation unit configured to calculate a downlink delay profile based on the first signal; an estimated value calculation unit configured to calculate an estimated propagation path delay or an estimated cyclic prefix length based on the calculated downlink delay profile; and an outputting unit configured to output the estimated propagation path delay or the estimated cyclic prefix length.

According to another aspect of the present invention, a receiving apparatus includes a receiving unit configured to receive a first signal transmitted from a base station; an estimated value calculation unit configured to obtain downlink quality information based on the first signal and to calculate an estimated downlink throughput based on the downlink quality information; and an outputting unit configured to output the estimated downlink throughput.

According to another aspect of the present invention, a receiving apparatus includes a receiving unit configured to receive a first signal transmitted from multiple base stations that perform downlink transmission in synchronization with each other; an estimated value calculation unit configured to obtain downlink quality information based on the first signal and to calculate an estimated downlink throughput based on the downlink quality information; and an outputting unit configured to output the estimated downlink throughput.

According to another aspect of the present invention, a receiving apparatus includes a communication unit configured to communicate with a base station; a receiving unit configured to receive a second signal transmitted from the base station; an estimated value calculation unit configured to calculate an estimated downlink throughput based on information in the second signal; and an outputting unit configured to output the estimated downlink throughput.

According to another aspect of the present invention, a receiving apparatus includes a receiving unit configured to receive a first signal transmitted from a base station; a first calculation unit configured to calculate, based on the first signal, a received power level of the first signal, a downlink received power level, a value obtained by dividing the received power level of the first signal by the downlink received power level, and a path loss for an entire frequency band of a mobile communication system; a second calculation unit configured to calculate, based on the first signal, the received power level of the first signal, the downlink received power level, the value obtained by dividing the received power level of the first signal by the downlink received power level, and the path loss for a part of the entire frequency band of the mobile communication system; and an outputting unit configured to output the received power level of the first signal, the downlink received power level, the value obtained by dividing the received power level of the first signal by the downlink received power level, and the path loss.

According to another aspect of the present invention, a receiving apparatus includes a receiving unit configured to receive a first signal transmitted from a base station; a path loss calculation unit configured to calculate a path loss based on the first signal; an uplink quality calculation unit configured to calculate, based on the path loss, an estimated uplink transmission power level of a fourth signal, an estimated uplink SIR, an estimated uplink throughput, and UE power headroom; and an outputting unit configured to output the estimated uplink transmission power level of the fourth signal, the estimated uplink SIR, the estimated uplink throughput, and the UE power headroom.

According to another aspect of the present invention, a receiving apparatus includes a communication unit configured to communicate with a base station; a receiving unit configured to receive a third signal transmitted from the base station; an uplink quality calculation unit configured to calculate an estimated uplink transmission power level of a fourth signal, an estimated uplink throughput, and UE power headroom; and an outputting unit configured to output the estimated uplink transmission power level of the fourth signal, the estimated uplink throughput, and the UE power headroom.

According to another aspect of the present invention, a receiving apparatus includes a receiving unit configured to receive a fifth signal transmitted from a base station; an error rate calculation unit configured to calculate an error rate of the fifth signal; and an outputting unit configured to output the error rate of the fifth signal.

According to another aspect of the present invention, a data obtaining method includes a receiving step of receiving a first signal transmitted from a base station; a delay profile calculation step of calculating a downlink delay profile based on the first signal; an estimated value calculation step of calculating an estimated propagation path delay or an estimated cyclic prefix length based on the calculated downlink delay profile; and an outputting step of outputting the estimated propagation path delay or the estimated cyclic prefix length.

According to another aspect of the present invention, a data obtaining method includes a receiving step of receiving a first signal transmitted from a base station; a quality information obtaining step of obtaining downlink quality information based on the first signal; an estimated value calculation step of calculating an estimated downlink throughput based on the downlink quality information; and an outputting step of outputting the estimated downlink throughput.

According to another aspect of the present invention, a data obtaining method includes a receiving step of receiving a first signal transmitted from multiple base stations that perform downlink transmission in synchronization with each other; a quality information obtaining step of obtaining downlink quality information based on the first signal; an estimated value calculation step of calculating an estimated downlink throughput based on the downlink quality information; and an outputting step of outputting the estimated downlink throughput.

According to another aspect of the present invention, a data obtaining method includes a receiving step of receiving a second signal transmitted from a base station; an estimated value calculation step of calculating an estimated downlink throughput based on information in the second signal; and an outputting step of outputting the estimated downlink throughput.

According to another aspect of the present invention, a data obtaining method includes a receiving step of receiving a first signal transmitted from a base station; a first calculation step of calculating, based on the first signal, a received power level of the first signal, a downlink received power level, a value obtained by dividing the received power level of the first signal by the downlink received power level, and a path loss for an entire frequency band of a mobile communication system; a second calculation step of calculating, based on the first signal, the received power level of the first signal, the downlink received power level, the value obtained by dividing the received power level of the first signal by the downlink received power level, and the path loss for a part of the entire frequency band of the mobile communication system; and an output step of outputting the received power level of the first signal, the downlink received power level, the value obtained by dividing the received power level of the first signal by the downlink received power level, and the path loss.

According to another aspect of the present invention, a data obtaining method includes a receiving step of receiving a first signal transmitted from a base station; a path loss calculation step of calculating a path loss based on the first signal; an uplink quality calculation step of calculating, based on the path loss, an estimated uplink transmission power level of a fourth signal, an estimated uplink SIR, an estimated uplink throughput, and UE power headroom; and an outputting step of outputting the estimated uplink transmission power level of the fourth signal, the estimated uplink SIR, the estimated uplink throughput, and the UE power headroom.

According to still another aspect of the present invention, a data obtaining method includes a receiving step of receiving a third signal transmitted from a base station; an uplink quality calculation step of calculating an estimated uplink transmission power level of a fourth signal, an estimated uplink throughput, and UE power headroom; and an outputting step of outputting the estimated uplink transmission power level of the fourth signal, the estimated uplink throughput, and the UE power headroom.

Advantageous Effect of the Invention

An aspect of the present invention provides a receiving apparatus and a data obtaining method that make it possible to evaluate communication quality in a communication area of a mobile communication system employing OFDM and SC-FDMA, adaptive modulation and coding, and/or shared channels.

EXPLANATION OF REFERENCES

Figure 1:
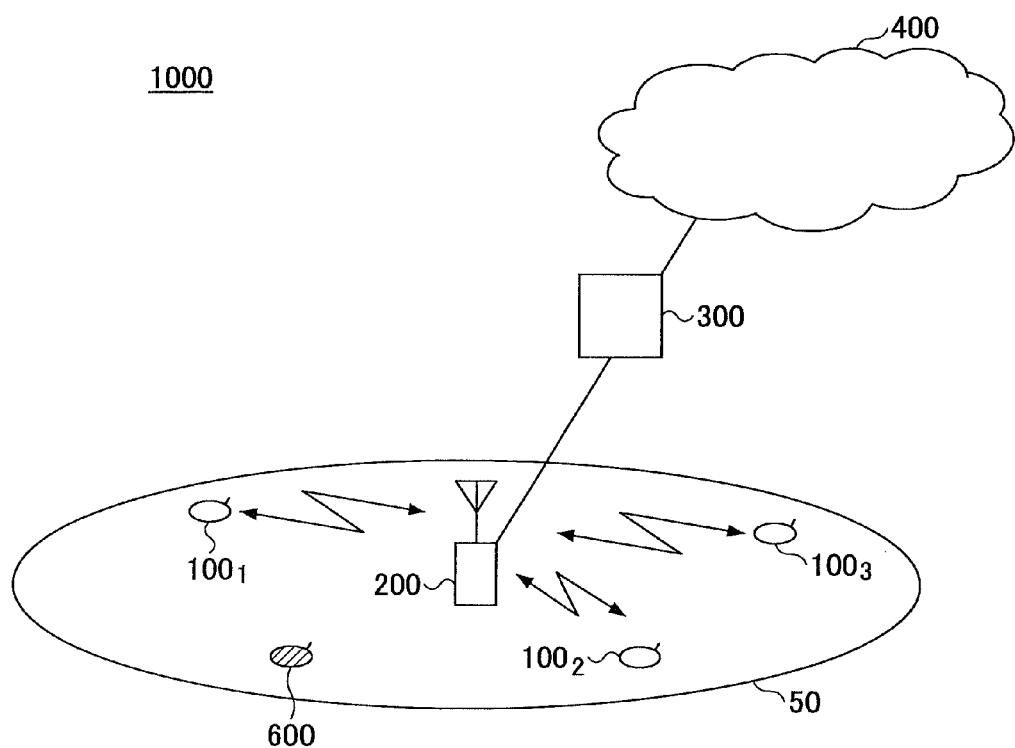
FIG. 1 is a drawing illustrating a configuration of a radio communication system according to an embodiment of the present invention.

| | |
|---|---|
| $50_1$ | $(50_1, 50_2, 50_3, \ldots, 50_1)$ Cell |
| $100_n$ | $(100_1, 100_2, 100_3, \ldots, 100_n)$ User device |
| $200_m$ | $(200_1, 200_2, 200_3, \ldots, 200_m)$ Base station |
| 202 | Transceiver antenna |
| 204 | Amplifier |
| 206 | Transceiver unit |
| 208 | Baseband signal processing unit |
| 2081 | Layer 1 processing unit |
| 20811 | Transmission processing unit |
| 20812 | Reception processing unit |
| 20813 | Control channel signal generating unit |
| 20814 | Data channel signal generating unit |
| 20815 | Broadcast channel signal generating unit |
| 20816 | Reference signal generating unit |

-continued

EXPLANATION OF REFERENCES

| | |
|---|---|
| 20817 | Uplink demodulation unit |
| 2082 | MAC processing unit |
| 2083 | RLC processing unit |
| 2084 | Out-of-sync determining unit |
| 210 | Call processing unit |
| 212 | Transmission path interface |
| 300 | Access gateway |
| 400 | Core network |
| 500 | Physical uplink shared channel |
| 600 | Receiving apparatus |
| 602 | Antenna |
| 604 | Amplifier |
| 606 | Transceiver unit |
| 608 | Baseband signal processing unit |
| 6080 | Analog-to-digital conversion unit (A/D) |
| 6081 | CP removing unit |
| 6082 | Fast Fourier transform unit (FFT) |
| 6083 | Demultiplexing unit (DeMUX) |
| 6084 | Data signal decoding unit |
| 6085 | Downlink reference signal receiving unit |
| 6086 | Uplink quality measuring unit |
| 6087 | Downlink quality measuring unit |
| 6088 | Delay profile measuring unit |
| 6089 | Reference signal measuring unit |
| 6090 | Error rate obtaining unit |
| 6091 | MAC processing unit |
| 6092 | RLC processing unit |
| 6093 | Signal generating unit |
| 6094 | Transmission processing unit |
| 610 | External input/output unit |
| 612 | Call processing unit |
| 614 | Application unit |
| 700 | Global positioning system (GPS) |

BEST MODE FOR CARRYING OUT THE INVENTION

First Embodiment

The best mode for carrying out the invention is described based on the following embodiments with reference to the accompanying drawings. Throughout the accompanying drawings, the same reference numbers are used for parts having the same functions, and overlapping descriptions of those parts are omitted.

A receiving apparatus 600 of this embodiment is used to evaluate communication quality in a communication area. The receiving apparatus 600 receives a downlink signal transmitted from a base station, calculates downlink communication quality and uplink communication quality based on the received signal, and outputs the calculated quality. Accordingly, in this embodiment, a receiving unit for receiving a reference signal, a calculation unit for calculating downlink and uplink communication quality, and an output unit for outputting the calculated communication quality included in the receiving apparatus 600 are mainly described.

A radio communication system 1000 including the receiving apparatus 600 and a base station 200 of this embodiment is described below with reference to FIG. 1.

The radio communication system 1000 is based on, for example, Evolved UTRA and UTRAN (also called Long Term Evolution (LTE) or Super 3G). The radio communication system 1000 includes the base station (eNode B: eNB) 200, mobile stations $100_n$ ($100_1, 100_2, 100_3 \ldots 100_n$, where n is an integer greater than 0), and the receiving apparatus 600 located in a cell 50 that is an area where a mobile communication service is provided by the base station 200. The base station 200 is connected to an upper node such as an access gateway 300 and the access gateway 300 is connected to a core network 400. The access gateway 300 may also be called a mobility management entity/serving gateway (MME/SGW).

In FIG. 1, for brevity, only one sector is shown for the base station 200. However, the base station 200 may have two or more sectors.

The receiving apparatus 600 may or may not be communicating with the base station 200 based on Evolved UTRA and UTRAN. When the receiving apparatus 600 communicates with the base station 200 based on Evolved UTRA and UTRAN, communication processing similar to that performed between the mobile stations $100_n$ and the base station 200 is performed between the receiving apparatus 600 and the base station 200.

The mobile stations $100_n$ ($100_1, 100_2, 100_3, \ldots, 100_n$) have the same configuration and functions and are therefore called the mobile station $100_n$ or the mobile stations $100_n$ in the descriptions below unless otherwise mentioned. Although mobile stations are used as examples of user equipment (UE) communicating with a base station in the descriptions below, user equipment communicating with a base station may also include fixed terminals.

In the radio communication system 1000, orthogonal frequency division multiplexing (OFDM) is used as the downlink radio access method and single-carrier frequency division multiple access (SC-FDMA) is used as the uplink radio access method. In OFDM, as described above, a frequency band is divided into narrow frequency bands (subcarriers) and data are transmitted on the subcarriers. In SC-FDMA, a frequency band is divided into multiple frequency bands and the frequency bands are allocated to different terminals for transmission in order to reduce interference between the terminals.

Communication channels used in Evolved UTRA and UTRAN are described below.

For downlink, a physical downlink shared channel (PD-SCH) shared by the mobile stations $100_n$ and a physical downlink control channel (PDCCH), which is a downlink control channel for LTE, are used. In downlink, the physical downlink control channel is used to report: downlink scheduling information including information on users to be mapped to the physical downlink shared channel and transport format information for the physical downlink shared channel; an uplink scheduling grant including information on users to be mapped to a physical uplink shared channel and transport format information for the physical uplink shared channel; and acknowledgement information for an uplink shared channel. Meanwhile, the physical downlink shared channel is used to transmit packet data. A transport channel for the packet data is a downlink shared channel (DL SCH). The downlink scheduling information may also be called downlink assignment information or a downlink scheduling grant. The downlink scheduling information and the uplink scheduling grant may be collectively called downlink control information.

Figure 2:
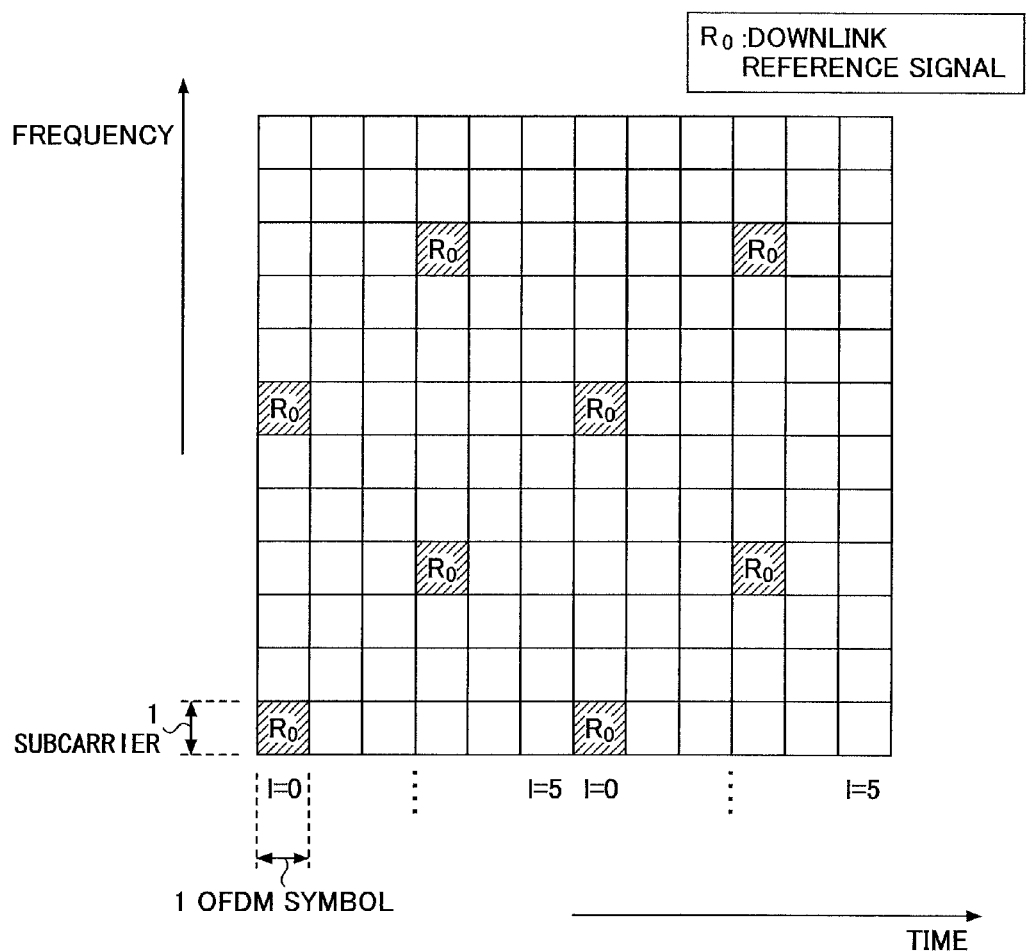
FIG. 2 is a drawing illustrating exemplary mapping of a downlink reference signal to physical resources.

Also in downlink, a downlink reference signal is transmitted as a pilot signal. The downlink reference signal is a two-dimensional sequence composed of a two-dimensional orthogonal sequence and a two-dimensional pseudo random sequence (see, for example, 3GPP TS 36.211 (V1.0.0), "Physical Channels and Modulation," March 2007). Instead, the downlink reference signal may be composed of a two-dimensional pseudo random sequence only. FIG. 2 shows exemplary mapping of the downlink reference signal to physical resources.

For uplink, a physical uplink shared channel (PUSCH) shared by the mobile stations $100_n$ and an LTE uplink control channel are used. There are two types of uplink control channels: the first is an uplink control channel to be time-division-multiplexed with the physical uplink shared channel, and the second is an uplink control channel to be frequency-division-multiplexed with the physical uplink shared channel. The uplink control channel to be frequency-division-multiplexed with the physical uplink shared channel is called a physical uplink control channel (PUCCH). A control signal mapped to the uplink control channel to be time-division-multiplexed with the physical uplink shared channel may be transmitted as a part of the physical uplink shared channel. In uplink, the LTE physical uplink control channel is used to report downlink quality information (channel quality indicator: CQI) used for scheduling and adaptive modulation and coding (AMC) of a downlink shared channel and to transmit acknowledgement information (HARQ ACK information) for a downlink shared channel. Meanwhile, the physical uplink shared channel is used to transmit packet data. A transport channel for the packet data is an uplink shared channel (UL-SCH).

Examples of the packet data include IP packets in Web browsing, FTP, and VoIP, and a control signal for radio resource control (RRC). Hereafter, packet data may also be called user data. Corresponding transport channels for the packet data (user data) are the DL-SCH and the UL-SCH, and corresponding logical channels for the packet data (user data) are a dedicated traffic channel (DTCH) and a dedicated control channel (DCCH).

Figure 3:
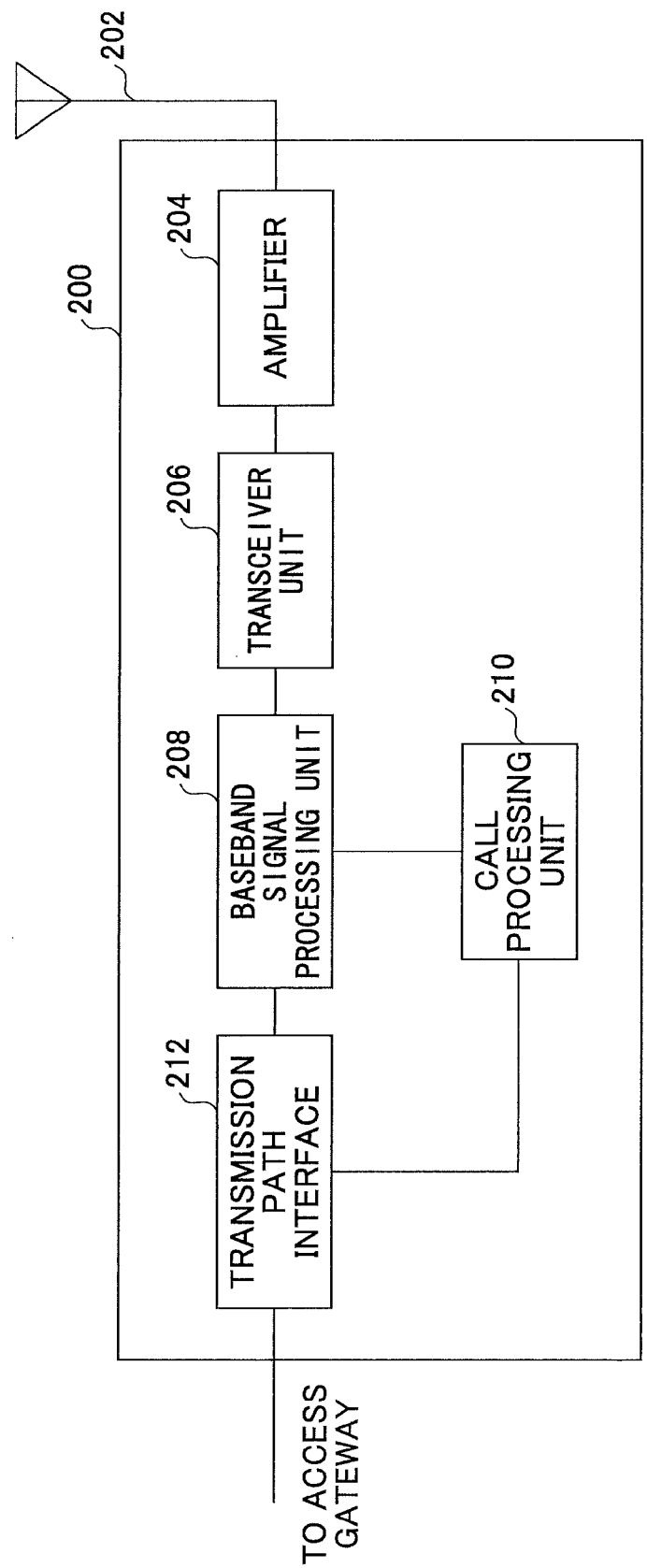
FIG. 3 is a block diagram of a base station according to an embodiment of the present invention.

The base station 200 of this embodiment is described below with reference to FIG. 3.

The base station 200 of this embodiment includes a transceiver antenna 202, an amplifier 204, a transceiver unit 206, a baseband signal processing unit 208, a call processing unit 210, and a transmission path interface 212.

Downlink packet data (user data) to be transmitted from the base station 200 to the mobile station $100_n$ are sent from an upper node such as the access gateway 300 to the base station 200 and input to the baseband signal processing unit 208 via the transmission path interface 212.

The baseband signal processing unit 208 performs, for the downlink packet data, PDCP layer transmission processing; segmentation/concatenation; RLC layer transmission processing such as transmission processing in RLC (radio link control) retransmission control; MAC (medium access control) retransmission control such as transmission processing in hybrid automatic repeat request (HARQ); scheduling; selection of transport formats; channel coding; and IFFT (inverse fast Fourier transform) processing. Then, the baseband signal processing unit 208 inputs the processed packet data to the transceiver unit 206. The baseband signal processing unit 208 also performs transmission processing such as channel coding and IFFT processing on a physical downlink control channel signal (downlink control channel for LTE) and a broadcast channel signal, and inputs the processed signals to the transceiver unit 206. Further, the baseband signal processing unit 208 generates a downlink reference signal (downlink pilot signal). The baseband signal processing unit 208 multiplexes the downlink reference signal, the packet data, the physical downlink control channel signal, and the broadcast channel signal, and inputs the multiplexed signal (baseband signal) to the transceiver unit 206.

The transceiver unit 206 performs frequency conversion to convert the baseband signal output from the baseband signal processing unit 208 into a radio frequency signal. The radio frequency signal is amplified by the amplifier 204 and transmitted from the transceiver antenna 202.

Meanwhile, when a radio frequency signal including uplink packet data is transmitted from the mobile station $100_n$ to the base station 200, the radio frequency signal is received by the transceiver antenna 202, amplified by the amplifier 204, and frequency-converted by the transceiver unit 206 into a baseband signal. Then, the transceiver unit 206 inputs the baseband signal to the baseband signal processing unit 208.

For the packet data in the input baseband signal, the baseband signal processing unit 208 performs FFT processing, IDFT processing, error correction decoding, reception processing in MAC retransmission control, RLC layer reception processing, PDCP layer reception processing, and so on. The processed packet data are transferred via the transmission path interface 212 to the access gateway 300. The baseband signal processing unit 208 also performs FFT processing and error correction decoding on acknowledgement information for a downlink shared channel and downlink quality information transmitted from the mobile station $100_n$ and included in the baseband signal.

The call processing unit 210 performs call processing such as establishment and release of communication channels, status management of the base station 200, and management of radio resources.

Figure 4:
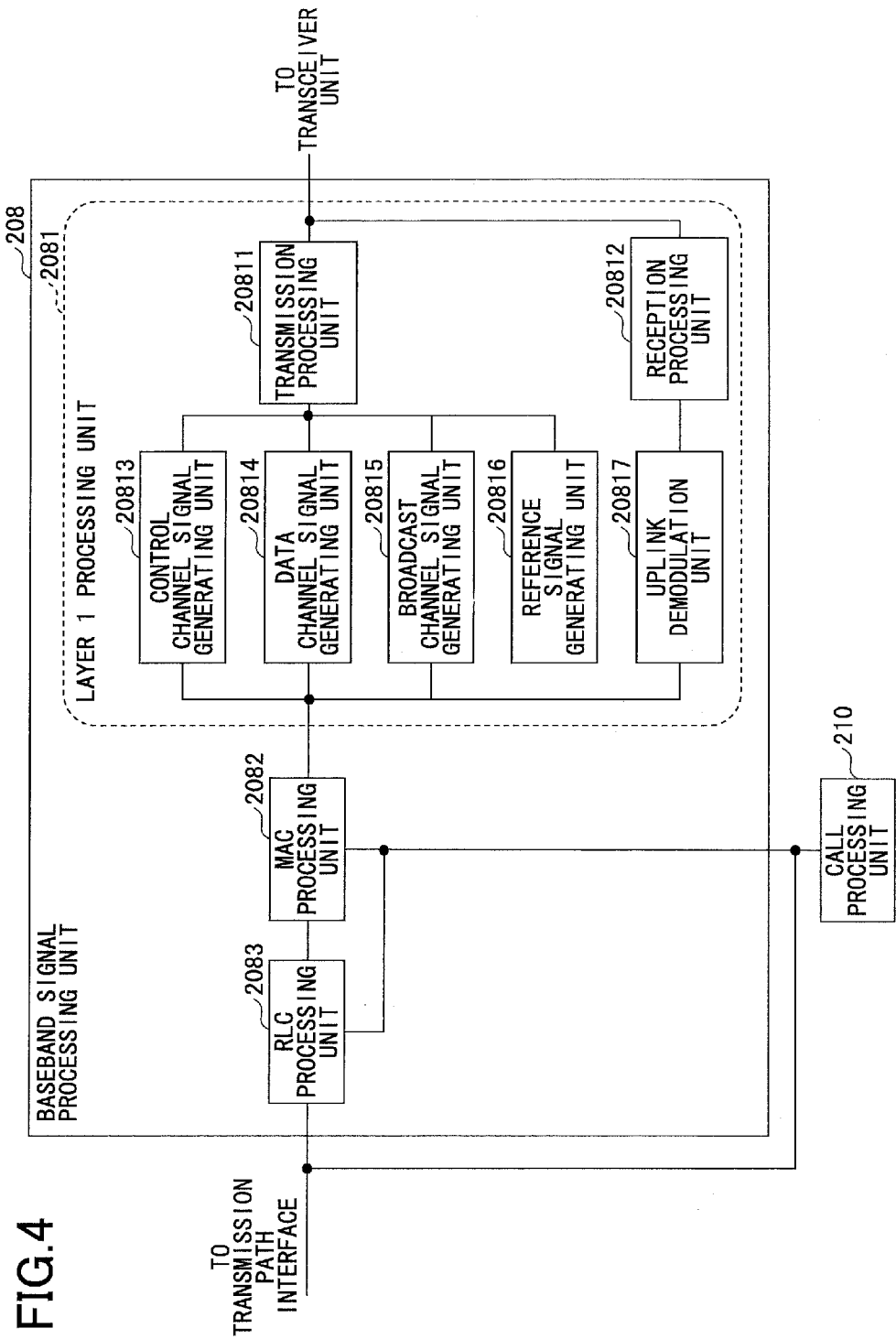
FIG. 4 is a block diagram of a baseband signal processing unit of a base station according to an embodiment of the present invention.

Next, a configuration of the baseband signal processing unit 208 is described with reference to FIG. 4.

The baseband signal processing unit 208 includes a layer 1 processing unit 2081, a MAC (medium access control) processing unit 2082, and an RLC processing unit 2083. The layer 1 processing unit 2081 includes a transmission processing unit 20811, a reception processing unit 20812, a control channel signal generating unit 20813, a data channel signal generating unit 20814, a broadcast channel signal generating unit 20815, a reference signal generating unit 20816, and an uplink demodulation unit 20817.

The layer 1 processing unit 2081, the MAC processing unit 2082, and the RLC processing unit 2083 of the baseband signal processing unit 208 and the call processing unit 210 are connected to each other. The control channel signal generating unit 20813, the data channel signal generating unit 20814, the broadcast channel signal generating unit 20815, and the uplink demodulation unit 20817 of the layer 1 processing unit 2081 and the MAC processing unit 2082 are connected to each other.

The layer 1 processing unit 2081 performs channel coding and IFFT processing on downlink transmission signals, and performs channel decoding and FFT processing on uplink transmission signals.

The control channel signal generating unit 20813 performs encoding, such as turbo coding and/or convolutional coding, and interleaving on a physical downlink control channel (PDCCH) to generate a PDCCH signal, and inputs the PDCCH signal to the transmission processing unit 20811. The data channel signal generating unit 20814 performs encoding, such as turbo coding and/or convolutional coding, and interleaving on a downlink shared channel (DL-SCH) (corresponding to a physical downlink shared channel (PDSCH)) to generate a DL-SCH signal, and inputs the DL-SCH signal to the transmission processing unit 20811. The broadcast channel signal generating unit 20815 performs encoding, such as turbo coding and/or convolutional coding, and interleaving on a broadcast channel (BCH) (corresponding to a physical broadcast channel (P-BCH) or a dynamic broadcast channel (D-BCH)) to generate a BCH signal, and inputs the BCH signal to the transmission processing unit 20811. The dynamic broadcast channel is also called a broadcast channel transmitted via the physical downlink shared channel (BCH on PDSCH). The reference signal generating unit 20816 generates a downlink reference signal and inputs the downlink reference signal to the transmission processing unit 20811. The transmission processing unit 20811 multiplexes the input signals, performs IFFT processing on the multiplexed signal, adds CPs to the IFFT-processed signal, and inputs the resulting signal to the transceiver unit 206.

Meanwhile, when an uplink signal including, for example, an uplink shared channel, downlink quality information, and acknowledgement information for a downlink shared channel is received from the mobile station $100_n$, the transceiver unit 206 converts the signal into a baseband signal and inputs the baseband signal to the reception processing unit 20812. The reception processing unit 20812 performs CP removal, FFT processing, frequency equalization, and inverse discrete Fourier transform (IDFT) processing on the baseband signal, and inputs the processed signal to the uplink demodulation unit 20817. The uplink demodulation unit 20817 decodes the (convolutional-coded and/or turbo-coded) signal, and inputs the decoded signal to the MAC processing unit 2082.

The MAC processing unit 2082 receives, from the uplink demodulation unit 20817 of the layer 1 processing unit 2081, the decoded signal including the downlink quality information, the acknowledgement information for a downlink shared channel, and the uplink shared channel.

The MAC processing unit 2082 performs MAC retransmission control such as transmission processing in HARQ, scheduling, selection of transport formats, allocation of frequency resources, and so on for downlink packet data. Here, "scheduling" indicates a process of selecting mobile stations allowed to receive the downlink packet data using a downlink shared channel in a given subframe. "Selection of transport formats" indicates a process of determining modulation schemes, coding rates, and data sizes of the downlink packet data to be received by the mobile stations selected in the scheduling. The modulation schemes, coding rates, and data sizes are determined, for example, based on CQIs reported via uplink by the mobile stations. "Allocation of frequency resources" indicates a process of allocating resource blocks to the downlink packet data to be received by the mobile stations selected in the scheduling. The resource blocks are allocated, for example, based on CQIs reported via uplink by the mobile stations. The CQIs reported by the mobile stations are input from the layer 1 processing unit 2081 to the MAC processing unit 2082. The MAC processing unit 2082 generates downlink scheduling information including IDs of users (mobile stations) allowed to communicate using the physical downlink shared channel and transport format information for downlink packet data to be transmitted via the physical downlink shared channel. The downlink scheduling information is determined through the scheduling, the selection of transport formats, and the allocation of frequency resources described above. The MAC processing unit 2082 inputs the downlink scheduling information to the layer 1 processing unit 2081. The MAC processing unit 2082 also inputs the downlink packet data to be transmitted to the mobile stations to the layer 1 processing unit 2081.

Also, the MAC processing unit 2082 performs reception processing in MAC retransmission control, scheduling, selection of transport formats, allocation of frequency resources, and so on for uplink packet data. Here, "scheduling" indicates a process of selecting mobile stations allowed to transmit the uplink packet data using an uplink shared channel in a given subframe. "Selection of transmission formats" indicates a process of determining modulation schemes, coding rates, and data sizes of the uplink packet data to be transmitted by the mobile stations selected in the scheduling. The modulation schemes, coding rates, and data sizes are determined, for example, based on SIRs of sounding reference signals (SRS) transmitted from the mobile stations via uplink and/or path losses between the base station and the mobile stations. "Allocation of frequency resources" indicates a process of allocating resource blocks to the uplink packet data to be transmitted by the mobile stations selected in the scheduling. The resource blocks are allocated, for example, based on SIRs of sounding reference signals (SRS) transmitted from the mobile stations via uplink. The MAC processing unit 2082 generates an uplink scheduling grant(s) including IDs of users (mobile stations) allowed to communicate using the physical uplink shared channel and transport format information for uplink packet data to be transmitted via the physical uplink shared channel. The uplink scheduling grant is determined through the scheduling, the selection of transport formats, and the allocation of frequency resources described above. The MAC processing unit 2082 inputs the uplink scheduling grant to the layer 1 processing unit 2081. The MAC processing unit 2082 also generates acknowledgement information for the uplink shared channel (UL-SCH) based on its demodulation result, and inputs the acknowledgement information to the layer 1 processing unit 2081.

The RLC processing unit 2083 performs, for downlink packet data, RLC layer transmission processing such as segmentation/concatenation and transmission processing in RLC retransmission control; and performs, for uplink packet data, RLC layer reception processing for uplink packet data such as segmentation/concatenation and reception processing in RLC retransmission control. The RLC processing unit 2083 may be configured to perform PDCP layer processing in addition to the RLC layer processing described above.

Next, the receiving apparatus 600 of this embodiment is described with reference to FIG. 5. The receiving apparatus 600 receives a downlink signal transmitted from the base station 200, calculates downlink communication quality and uplink communication quality based on the received signal, and outputs the calculated quality. Components relevant to these functions of the receiving apparatus 600 are mainly described below.

Figure 5:
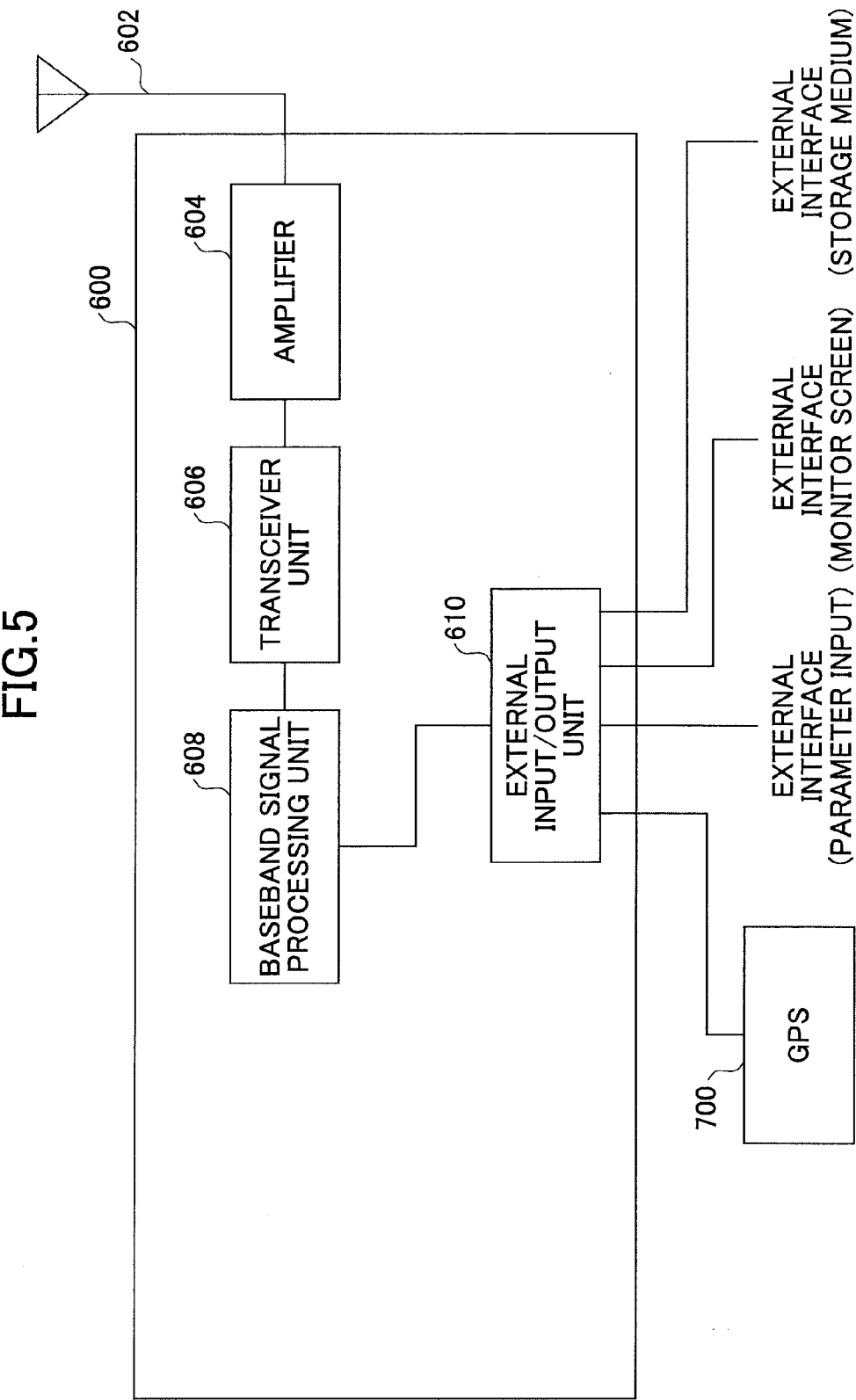
FIG. 5 is a block diagram of a receiving apparatus according to an embodiment of the present invention.

As shown in FIG. 5, the receiving apparatus 600 includes an antenna 602, an amplifier 604, a transceiver unit 606, a baseband signal processing unit 608, and an external input/output unit 610.

A downlink radio frequency signal transmitted from the base station 200 is received by the antenna 602 and input to the amplifier 604. The amplifier 604 amplifies the radio frequency signal and inputs the amplified radio frequency signal to the transceiver unit 606. The transceiver unit 606 frequency-converts the amplified radio frequency signal into a baseband signal and inputs the baseband signal to the baseband signal processing unit 608. Then, the baseband signal processing unit 608 performs reception processing for the baseband signal such as FFT processing and error correction decoding.

Also, based on a downlink reference signal in the baseband signal, the baseband signal processing unit 608 performs an expected (estimated) CP length calculation process of calculating a delay profile and outputting an estimated propagation path delay or an expected (estimated) cyclic prefix (CP) length; a downlink quality calculation process of calculating downlink quality and/or an expected (estimated) downlink throughput; an uplink quality calculation process of calculating an expected (estimated) uplink transmission power level and/or an expected (estimated) uplink throughput; and a measuring process of calculating a reception level of the reference signal and/or a downlink reception level. In the descriptions below, the term "expected" may be replaced with "estimated".

Next, a configuration of the baseband signal processing unit 608 is described with reference to FIG. 6. The baseband signal processing unit 608 includes an analog-to-digital conversion unit (A/D) 6080, a CP removing unit 6081, an FFT 6082, a DeMUX 6083, a data signal decoding unit 6084, a downlink reference signal receiving unit 6085, an uplink quality measuring unit 6086, a downlink quality measuring unit 6087, a delay profile measuring unit 6088, a reference signal measuring unit 6089, and an error rate obtaining unit 6090.

The analog-to-digital conversion unit (A/D) 6080 converts an analog baseband signal input from the transceiver unit 606 into a digital signal and inputs the digital signal to the CP removing unit 6081.

The CP removing unit 6081 removes CPs from received symbols and inputs remaining effective symbols to the FFT 6082.

The fast Fourier transform unit (FFT) 6082 fast-Fourier-transforms the input signal and thereby OFDM-demodulates the signal, and inputs the demodulated signal to the DeMUX 6083.

The demultiplexing unit (DeMUX) 6083 separates a downlink reference signal and a common channel signal from the demodulated signal, inputs the downlink reference signal to the downlink reference signal receiving unit 6085, and inputs the common channel signal to the data signal decoding unit 6084.

The downlink reference signal receiving unit 6085 performs channel estimation based on the downlink reference signal and determines channel compensation to be applied to a received data signal. In other words, the downlink reference signal receiving unit 6085 calculates a channel estimate. The downlink reference signal receiving unit 6085 inputs the calculated channel estimate to the data signal decoding unit 6084. The downlink reference signal receiving unit 6085 also inputs the downlink reference signal and the channel estimate to the uplink quality measuring unit 6086, the downlink quality measuring unit 6087, the delay profile measuring unit 6088, the reference signal measuring unit 6089, and the error rate obtaining unit 6090.

The data signal decoding unit 6084 receives the channel estimate from the downlink reference signal receiving unit 6085, and applies channel compensation based on the channel estimate to the downlink data signal received from the base station 200 to decode the downlink data signal. Here, the data signal indicates the common channel signal transmitted from the base station 200. The common channel signal, for example, includes common channels such as a physical broadcast channel (P-BCH), a dynamic broadcast channel (D-BCH), downlink scheduling information for the D-BCH, a paging channel (PCH), and/or a paging indicator (PI) (downlink scheduling information for the PCH). After decoding the data signal, the data signal decoding unit 6084 reports the decoding results to the error rate obtaining unit 6090. Logical channels corresponding to the common channels are, for example, a broadcast control channel (BCCH) and a paging control channel (PCCH).

Also, the data signal decoding unit 6084 obtains information from the P-BCH and the D-BCH, and inputs the obtained information to relevant components of the receiving apparatus 600 as needed. For example, the data signal decoding unit 6084 may obtain information regarding the transmission power level of the downlink reference signal from the P-BCH or the D-BCH, and input the obtained information to the uplink quality measuring unit 6086 and the reference signal measuring unit 6089. Also, the data signal decoding unit 6084 may obtain information (P0) regarding uplink transmission power control from the P-BCH or the D-BCH, and input the obtained information to the uplink quality measuring unit 6086.

The uplink quality measuring unit 6086 receives the channel estimate and the downlink reference signal from the downlink reference signal receiving unit 6085. Based on the downlink reference signal, the uplink quality measuring unit 6086 calculates a path loss; and calculates an expected (estimated) uplink transmission power level, an expected (estimated) uplink SIR, an expected (estimated) uplink throughput, and UE power headroom based on the calculated path loss.

A method of calculating the path loss is described below. First, a received power level of the downlink reference signal (reference signal received power (RSRP)) is calculated based on the channel estimate and the downlink reference signal (see, 3GPP TS36.214, v 1.0.0, 2007-05, for a definition of the reference signal received power (RSRP)). Then, a path loss is calculated based on the received power level of the downlink reference signal and a transmission power level of the downlink reference signal at the base station 200 as follows:

Path loss=(transmission power level of downlink reference signal)–(received power level of downlink reference signal)

In the above formula, the path loss is represented in dB.

The transmission power level of the downlink reference signal may be provided as a parameter in the receiving apparatus 600 or may be input from the outside via the external input/output unit 610. Also, the transmission power level of the downlink reference signal may be determined based on the information regarding the transmission power level of the downlink reference signal obtained from the P-BCH or the D-BCH. The information regarding the transmission power level of the downlink reference signal obtained from the P-BCH or the D-BCH is input from the data signal decoding unit 6084.

Meanwhile, if the receiving apparatus 600 includes two receiving antennas, the received power level of the downlink reference signal and a downlink received carrier power level may be measured in one of the following three methods:

(1) Using a value measured at one of the two antennas (main antenna).

(2) Using an average of values measured at the two antennas.

(3) Using the sum of values measured at the two antennas.

The three methods may be provided as parameters in the receiving apparatus 600 or may be input from the outside via the external input/output unit 610.

Based on the calculated path loss, the uplink quality measuring unit 6086 calculates an expected (estimated) transmission power level of an uplink transmission signal, an expected (estimated) uplink throughput, and UE power headroom.

For example, the uplink quality measuring unit 6086 calculates an expected transmission power level of a physical uplink shared channel using the following formula:

Expected transmission power level=min($P$max,10*log $M+P0+a1*PL+\text{delta\_mcs}+f(\text{delta\_i})$)

where,

Pmax: the maximum transmission power level of mobile station (e.g., 24 dBm)

M ($M_{pusch}$): the number of allocated resource blocks

P0 ($P0_{pusch}$): a value reported via a broadcast channel a1 ($\alpha$): a coefficient PL: path loss delta_mcs ($\Delta_{TF}(i)$): a value reported via an RRC message*"i" in $\Delta_{TF}(i)$ indicates an index indicating a time unit such as a subframe number.

delta_i: a correction parameter, may be simply called "i"

f(*): a function that takes delta_i as an argument

Pmax, M, P0, a1, delta_mcs, delta_i, and f(*) may be provided as parameters in the receiving apparatus 600 or may be input from the outside via the external input/output unit 610. Also, P0 may be determined based on the information regarding uplink transmission power control obtained from the P-BCH or the D-BCH. The information (P0) regarding uplink transmission power control is input from the data signal decoding unit 6084.

The above formula for obtaining an expected transmission power level is just an example. Any appropriate formula taking a path loss as an argument may be used to calculate an expected transmission power level of the physical uplink shared channel.

In the above example, an expected transmission power level of the physical uplink shared channel is obtained using a formula. Alternatively, an expected transmission power level of a sounding reference signal, an uplink control channel, or a random access channel may be calculated using a similar formula. Also, an expected transmission power level of a sounding reference signal, an uplink control channel, or a random access channel may be calculated by offsetting the expected transmission power level of the physical uplink shared channel.

An expected UE power headroom (UPH) may be calculated based on the expected transmission power level of the physical uplink shared channel using the following formula:

Expected UPH[dB]=$P$max–(expected transmission power level of physical uplink shared channel)

Similarly, expected UPHs regarding the sounding reference signal, the uplink control channel, and the random access channel may be calculated based on their expected transmission power levels as follows:

Expected UPH(for SRS)=$P$max–(expected transmission power level of sounding reference signal)

Expected UPH(for uplink control channel)=$P$max–(expected transmission power level of uplink control channel)

Expected UPH(for RACH)=$P$max–(expected transmission power level of random access channel)

The expected transmission power levels and the expected UPHs described above may be represented by averages in the frequency domain and/or the time domain. An average in the time domain may be calculated over an averaging period defined as a parameter. For example, an average may be calculated over an averaging period of 1 ms. Also, the average calculated over 1 ms may be filtered using the following formula to obtain a value $F_n$:

$$F_n=(1-a)\times F_{n-1}+a\times M_n$$

where, $F_n$: current value obtained by filtering $F_{n-1}$: previous value obtained by filtering a: filtering factor $M_n$: average over 1 ms For example, the filtering factor "a" may be set at $\frac{1}{2}^{(k/2)}$ (k=0, 1, 2, . . . ). The averaging period and the filtering factor "a" may be provided as parameters in the receiving apparatus 600 or may be input from the outside via the external input/output unit 610.

Instead of averaging calculated values in the time domain as described above, calculated values may be averaged based on positional information of the receiving apparatus 600. For example, the expected transmission power levels and the expected UPHs described above may be averaged over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 110. The averaging interval based on the positional information may be provided as a parameter in the receiving apparatus 600 or may be input from the outside via the external input/output unit 610.

Figure 7:
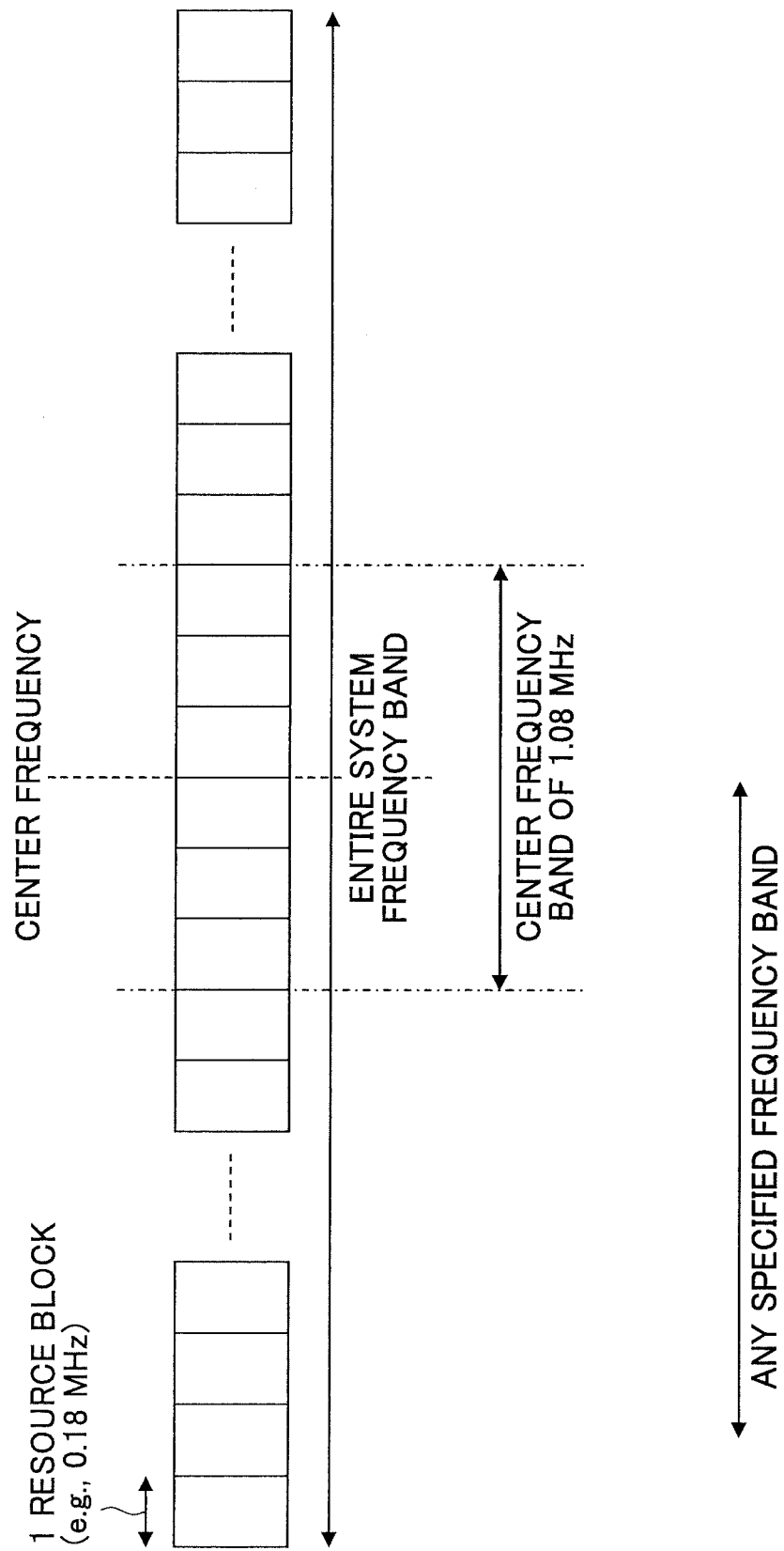
FIG. 7 is a drawing used to describe an exemplary method of calculating CQIs.
Figure 8:
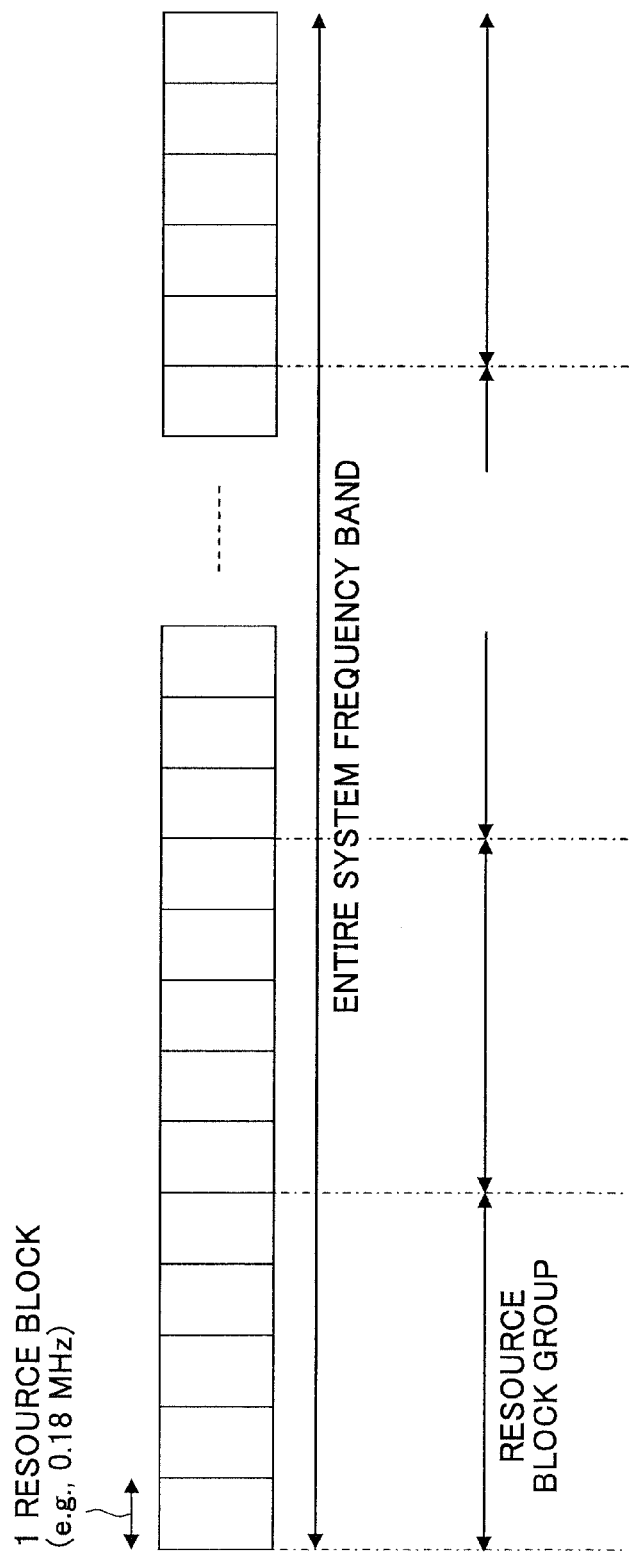
FIG. 8 is a drawing used to describe an exemplary method of calculating CQIs.

An average in the frequency domain may be calculated, as shown in FIG. 7, over the entire system frequency band, or over a center frequency band of 1.08 MHz located in the center of the system frequency band, i.e., including the center frequency of the system frequency band. In FIG. 7, the center frequency band is composed of six resource blocks and includes the center frequency of the system frequency band. The horizontal axis in FIG. 7 indicates frequency. In LTE, the center frequency band of 1.08 MHz is used to transmit a synchronization channel (SCH) (or a synchronization signal). An average may instead be calculated over each resource block, or more flexibly, over any frequency band specified in the system frequency band. Further, as shown in FIG. 8, an average may be calculated over each resource block group including multiple resource blocks. In the example of FIG. 8, one resource block group includes five resource blocks. The horizontal axis in FIG. 8 indicates frequency. The averaging interval (or range) in the frequency domain may be provided as a parameter in the receiving apparatus 600 or may be input from the outside via the external input/output unit 610.

If the expected uplink transmission power level or the expected UPH is to be calculated for each resource block or resource block group, expected uplink transmission power levels or expected UPHs may be calculated for M (where M>0) resource blocks or resource block groups selected in ascending order of the path loss. The value M may be provided as a parameter in the receiving apparatus 600 or may be input from the outside via the external input/output unit 610.

An expected uplink throughput may be calculated as described below based on the expected uplink transmission power level, the path loss, and an interference level.

First, an expected uplink SIR at the base station 200 is calculated as follows:

Expected uplink SIR=(expected uplink transmission power level)−(path loss)−(interference level)

The interference level may be provided as a parameter in the receiving apparatus 600 or may be input from the outside via the external input/output unit 610. In either case, the interference level is a value that is normalized with respect to a bandwidth of a frequency band for which the expected uplink transmission power level is calculated.

Next, an expected uplink throughput is calculated based on a look-up table as exemplified by table 1 and the expected uplink SIR. Table 1 shows the correspondence between expected SIRs [dB] and throughputs [Mbps] per resource block.

TABLE 1

| Expected SIR X [dB] | Throughput per resource block [Mbps] |
|---|---|
| X < −3.5 dB | 0.0 |
| −3.5 dB ≤ X < −2.5 dB | 0.1 |
| −2.5 dB ≤ X < −1.5 dB | 0.12 |
| −1.5 dB ≤ X < −0.5 dB | 0.15 |
| −0.5 dB ≤ X < 0.5 dB | 0.2 |
| 0.5 dB ≤ X < 1.5 dB | 0.25 |
| ... | ... |
| 25.5 dB ≤ X | 60 |

Table 1 is used to identify a throughput per resource block. Alternatively, a look-up table for identifying a throughput of the entire system frequency band or a throughput of a given frequency band in the system frequency band may be used.

As described above, the expected uplink transmission power level may be represented by an average in the time domain and/or the frequency domain. Similarly, the expected uplink SIR and the expected uplink throughput may be represented by averages in the time domain and/or the frequency domain.

For example, the expected uplink throughput may be obtained by averaging calculated values in the time domain over the averaging period and filtering the averaged value based on the filtering factor "a".

Instead of averaging calculated values in the time domain as described above, calculated values may be averaged based on positional information of the receiving apparatus 600. For example, the expected uplink SIR and the expected uplink throughput may be obtained by averaging calculated values over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

An average in the frequency domain of the expected uplink throughput may be calculated over the entire system frequency band, over a center frequency band of 1.08 MHz located in the center of the system frequency band, i.e., including the center frequency of the system frequency band, over a given frequency band in the system frequency band, over each resource block, or over each resource block group. If the expected throughput is to be calculated for each resource block or resource block group, the highest M expected throughputs of resource blocks or resource block groups may be selected.

The averaging period in the time domain, the filtering factor "a", the averaging interval (or range) in the frequency domain, and the value M may be provided as parameters in the receiving apparatus 600 or may be input from the outside via the external input/output unit 610.

The look-up table of table 1 is just an example, and any appropriate look-up table containing different values may be used for the calculations described above.

In addition to calculating the expected uplink transmission power level, the expected uplink SIR, the expected uplink throughput, and the expected UPH based on the downlink reference signal transmitted from the base station 200, those values may also be calculated based on a downlink reference signal transmitted from a neighboring base station. Also, if each base station covers multiple sectors, the above expected values may be calculated based on downlink reference signals transmitted from all sectors of the base station 200 and the neighboring base station. Further, the uplink quality measuring unit 6086 may be configured to calculate the expected uplink transmission power level, the expected uplink SIR, the expected uplink throughput, and the expected UPH based on reference signals from all base stations (or sectors) that the receiving apparatus 600 can receive.

After calculations, the uplink quality measuring unit 6086 inputs the expected uplink transmission power level, the expected uplink SIR, the expected uplink throughput, and the expected UPH to the external input/output unit 610.

The expected uplink transmission power level, the expected uplink SIR, the expected uplink throughput, and the expected UPH input to the external input/output unit 610 are output, for example, as graphs or numerical data to the outside (e.g., a monitor screen or a storage medium) as described later. Also, the expected uplink transmission power level, the expected uplink SIR, the expected uplink throughput, and the expected UPH may be output, for example, as graphs or numerical data to the outside (e.g., a monitor screen or a storage medium) together with the positional information of the receiving apparatus 600. Thus, the expected uplink transmission power level, the expected uplink SIR, the expected uplink throughput, and the expected UPH are output to the outside and thereby made available to a network operator (or a user, a device, or so on). In short, the receiving apparatus 600 calculates the expected uplink transmission power level, the expected uplink SIR, the expected uplink throughput, and the expected UPH based on a downlink reference signal transmitted from the base station 200, and thereby makes it possible to evaluate uplink transmission efficiency, radio capacity, and cell coverage of the radio communication system 1000.

The downlink quality measuring unit 6087 receives the channel estimate and the downlink reference signal from the downlink reference signal receiving unit 6085. Based on the channel estimate and the downlink reference signal, the downlink quality measuring unit 6087 calculates downlink quality information (channel quality indicator) and an expected downlink throughput.

For example, the downlink quality information is obtained by referring to a look-up table as shown by table 2 based on an SIR of the downlink reference signal. Table 2 shows the correspondence between CQIs and SIRs [dB]. Alternatively, the SIR itself may be used as the downlink quality information.

TABLE 2

| CQI | SIR X [dB] |
|---|---|
| 0 | X < −3.5 dB |
| 1 | −3.5 dB ≤ X < −2.5 dB |
| 2 | −2.5 dB ≤ X < −1.5 dB |
| 3 | −1.5 dB ≤ X < −0.5dB |
| ... | ... |
| 30 | 25.5 dB ≤ X |

Also, the downlink quality information may be obtained by referring to a look-up table as shown by table 3. Table 3 shows the correspondence between CQIs, the numbers of resource blocks (No. RB), modulation schemes, and payload sizes. In this case, a CQI of a received signal having an error rate less than or equal to a predetermined value and having the largest payload size may be used as the downlink quality information.

TABLE 3

| CQI | No. RB | Modulation | Payload size |
|---|---|---|---|
| 0 | 25 | QPSK | 137 |
| 1 | 25 | QPSK | 173 |
| 2 | 25 | 16 QAM | 233 |
| 3 | 25 | 16 QAM | 317 |
| ... | | ... | ... |
| 30 | 25 | 64 QAM | 7168 |

The SIR described above may be represented by an average in the frequency domain and the time domain.

An average in the time domain may be calculated over an averaging period defined as a parameter. For example, an average may be calculated over an averaging period of 1 ms. Also, the average calculated over 1 ms may be filtered using the following formula to obtain a value $F_n$:

$$F_n = (1-a) \times F_{n-1} + a \times M_n$$

where,
$F_n$: current value obtained by filtering
$F_{n-1}$: previous value obtained by filtering
a: filtering factor
$M_n$: average over 1 ms For example, the filtering factor "a" may be set at $\frac{1}{2}^{(k/2)}$ (k=0, 1, 2, . . . ). The averaging period and the filtering factor "a" may be provided as parameters in the receiving apparatus 600 or may be input from the outside via the external input/output unit 610.

Instead of averaging calculated values in the time domain as described above, calculated values may be averaged based on positional information of the receiving apparatus 600. For example, the SIR may be obtained by averaging SIRs over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

An average in the frequency domain may be calculated, as shown in FIG. 7, over the entire system frequency band, or over a center frequency band of 1.08 MHz located in the center of the system frequency band, i.e., including the center frequency of the system frequency band. In LTE, the center frequency band of 1.08 MHz is used to transmit a synchronization channel (SCH). An average may instead be calculated over each resource block, or more flexibly, over any frequency band specified in the system frequency band. Further, as shown in FIG. 8, an average may be calculated over each resource block group including multiple resource blocks. In the example of FIG. 8, one resource block group includes five resource blocks. The averaging interval (or range) in the frequency domain may be provided as a parameter in the receiving apparatus 600 or may be input from the outside via the external input/output unit 610.

If the SIR is to be calculated for each resource block or resource block group, the highest M SIRs of resource blocks or resource block groups may be selected. The value M may be provided as a parameter in the receiving apparatus 600 or may be input from the outside via the external input/output unit 610.

An expected downlink throughput may be calculated as described below based on the downlink quality information (channel quality indicator) calculated as described above.

TABLE 4

| CQI | Throughput per resource block [Mbps] |
|---|---|
| 0 | 0.0 |
| 1 | 0.1 |
| 2 | 0.12 |
| 3 | 0.15 |
| 4 | 0.2 |
| 5 | 0.25 |
| ... | ... |
| 30 | 60 |

For example, an expected downlink throughput is calculated based on a look-up table as shown by table 4 and the downlink quality information. Table 4 shows the correspondence between CQIs and throughputs [Mbps] per resource block. Table 4 is used to identify a throughput per resource block. Alternatively, a look-up table for identifying a throughput of the entire system frequency band or a throughput of a given frequency band in the system frequency band may be used.

As described above, the downlink quality information may be represented by an average in the time domain and/or the frequency domain. Similarly, the expected downlink throughput may be represented by an average in the time domain and/or the frequency domain. For example, the expected downlink throughput may be obtained by averaging throughputs in the time domain over the averaging period and filtering the averaged throughput based on the filtering factor "a". Instead of averaging throughputs in the time domain as described above, throughputs may be averaged based on positional information of the receiving apparatus 600. For example, the expected downlink throughput may be obtained by averaging throughputs over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

An average in the frequency domain of the expected downlink throughput may be calculated over the entire system frequency band, over a center frequency band of 1.08 MHz located in the center of the system frequency band, i.e., including the center frequency of the system frequency band, over a given frequency band in the system frequency band, over each resource block, or over each resource block group. If the expected throughput is to be calculated for each resource block or resource block group, the highest M expected throughputs of resource blocks or resource block groups may be selected.

The averaging period in the time domain, the filtering factor "a", the averaging interval (or range) in the frequency domain, and the value M may be provided as parameters in the receiving apparatus 600 or may be input from the outside via the external input/output unit 610.

The look-up tables of tables 2, 3, and 4 are just examples, and any appropriate look-up tables containing different values may be used for the calculations described above.

A method of calculating downlink quality information (channel quality indicator) and a downlink throughput in a case where multiple input multiple output (MIMO) is employed for downlink is described below.

When MIMO is employed, the number of streams to be transmitted (i.e., "rank") varies depending on the radio quality of the propagation environment. For example, one stream is transmitted, for example, at the edge of a cell where the radio quality is poor; and two streams are transmitted, for example, at the center of the cell where the radio quality is good. In this exemplary case, the mobile station calculates an SIR or downlink quality information (channel quality indicator) and an expected throughput based on a downlink reference signal for each of the numbers of streams one and two, and reports the number of streams that provides the highest expected throughput to the base station 200. The base station 200 controls the number of streams for downlink based on the number of streams reported from the mobile station. When closed-loop MIMO is employed, the mobile station may report, in addition to the number of streams, an optimum precoding matrix to the base station 200.

The number of streams is one or two when the number of transmitting antennas and the number of receiving antennas are two. Meanwhile, the number of streams is one, two, three, or four when the number of transmitting antennas and the number of receiving antennas are four.

The downlink quality measuring unit 6087 may be configured to calculate the number of streams (rank) in addition to downlink quality information and an expected throughput. That is, when MIMO is employed, the downlink quality measuring unit 6087 may be configured to calculate downlink quality information, an expected throughput, and the number of streams (rank).

In addition to calculating the downlink quality information (channel quality indicator), the expected downlink throughput, and the number of streams (when MIMO is employed) based on the downlink reference signal transmitted from the base station 200, those values may also be calculated based on a downlink reference signal transmitted from a neighboring base station. Also, if each base station covers multiple sectors, the above calculations may be performed based on downlink reference signals transmitted from all sectors of the base station 200 and the neighboring base station. Further, the downlink quality measuring unit 6087 may be configured to calculate the downlink quality information (channel quality indicator), the expected downlink throughput, and the number of streams (when MIMO is employed) based on reference signals from all base stations (or sectors) that the receiving apparatus 600 can receive. The downlink quality measuring unit 6087 inputs the downlink quality information (channel quality indicator), the expected downlink throughput, and the number of streams (when MIMO is employed) to the external input/output unit 610.

The downlink quality information (channel quality indicator), the expected downlink throughput, and the number of streams (when MIMO is employed) input to the external input/output unit 610 are output, for example, as graphs or numerical data to the outside (e.g., a monitor screen or a storage medium) as described later. Also, the downlink quality information (channel quality indicator), the expected downlink throughput, and the number of streams (when MIMO is employed) may be output, for example, as graphs or numerical data to the outside (e.g., a monitor screen or a storage medium) together with the positional information of the receiving apparatus 600. Thus, the downlink quality information (channel quality indicator) (i.e., radio quality of a downlink reference signal in a cell), the expected downlink throughput (i.e., expected throughput of a downlink shared channel), and the number of streams (when MIMO is employed) are output to the outside and thereby made available to a network operator (or a user, a device, or so on). In short, the receiving apparatus 600 calculates the downlink quality information (channel quality indicator), the expected downlink throughput, and the number of streams (when MIMO is employed) based on a downlink reference signal transmitted from the base station 200, and thereby makes it possible to evaluate downlink transmission efficiency and radio capacity of the radio communication system 1000.

The delay profile measuring unit 6088 receives the channel estimate and the downlink reference signal from the downlink reference signal receiving unit 6085. The delay profile measuring unit 6088 calculates a downlink delay profile based on the received downlink reference signal. For example, the delay profile measuring unit 6088 calculates a delay profile by performing IFFT processing on an FFT-processed reference signal (channel estimate).

Figure 9:
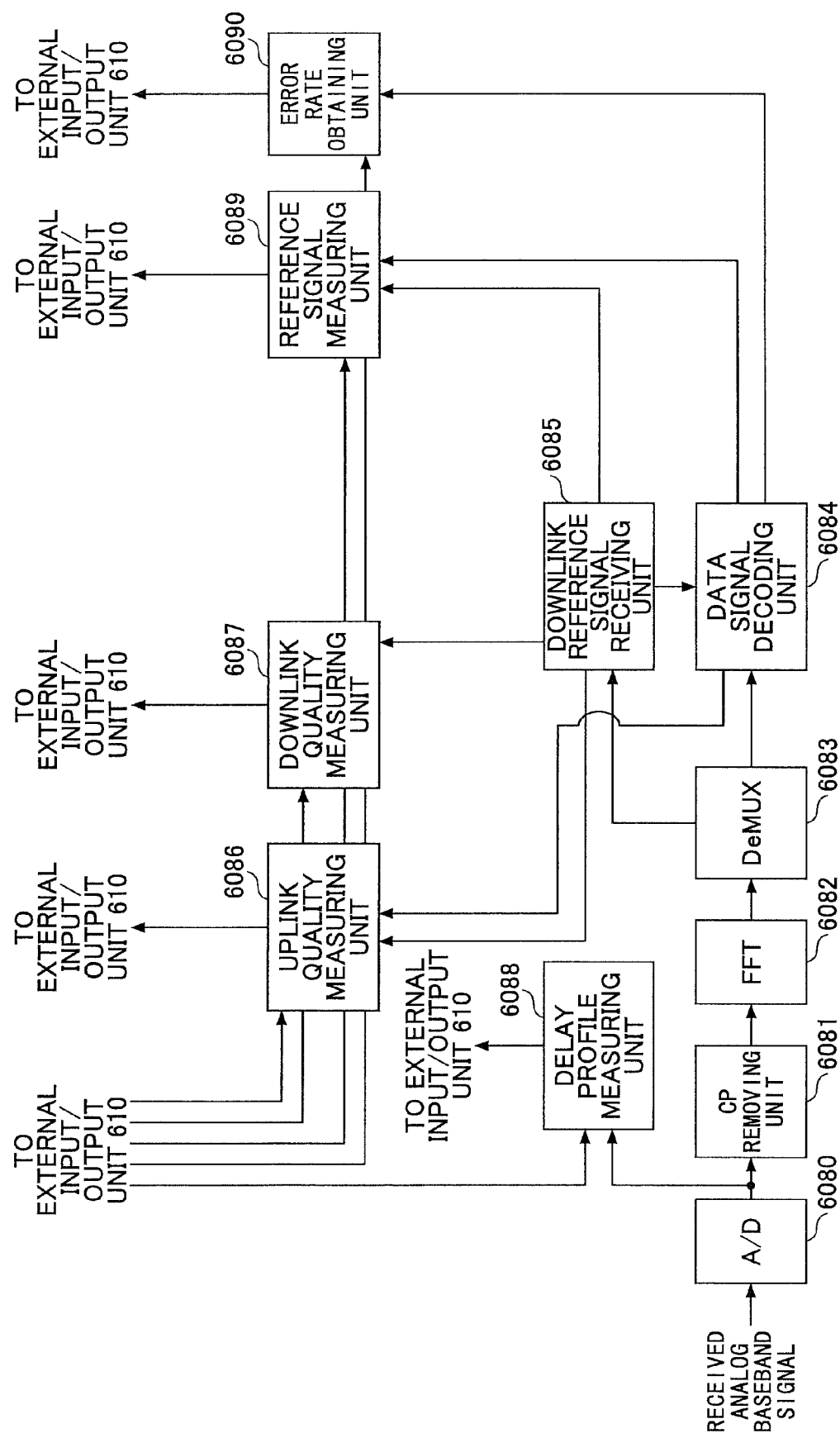
FIG. 9 is a block diagram illustrating a receiving unit of a baseband signal processing unit of a receiving apparatus according to an embodiment of the present invention.

Alternatively, the delay profile measuring unit 6088 may be configured to calculate a delay profile based on time correlation between a downlink received signal before FFT processing and an IFFT-processed transmission sequence of a known reference signal. In this case, as shown in FIG. 9, a copy of a downlink received signal (before FFT processing) is input from the analog-to-digital conversion unit (A/D) 6080 to the delay profile measuring unit 6088.

The delay profile may be represented by an average calculated over an averaging period. The averaging period may be provided as a parameter in the receiving apparatus 600 or may be input from the outside via the external input/output unit 610.

Instead of averaging delay profiles in the time domain as described above, delay profiles may be averaged based on positional information of the receiving apparatus 600. For example, delay profiles may be averaged over an averaging interval of 100 m, i.e., every 100-m movement of the receiving apparatus 600. A two-dimensional parameter such as 100 $m^2$ may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610. After calculating the delay profile, the delay profile measuring unit 6088 calculates an expected (estimated) CP length.

Figure 10:
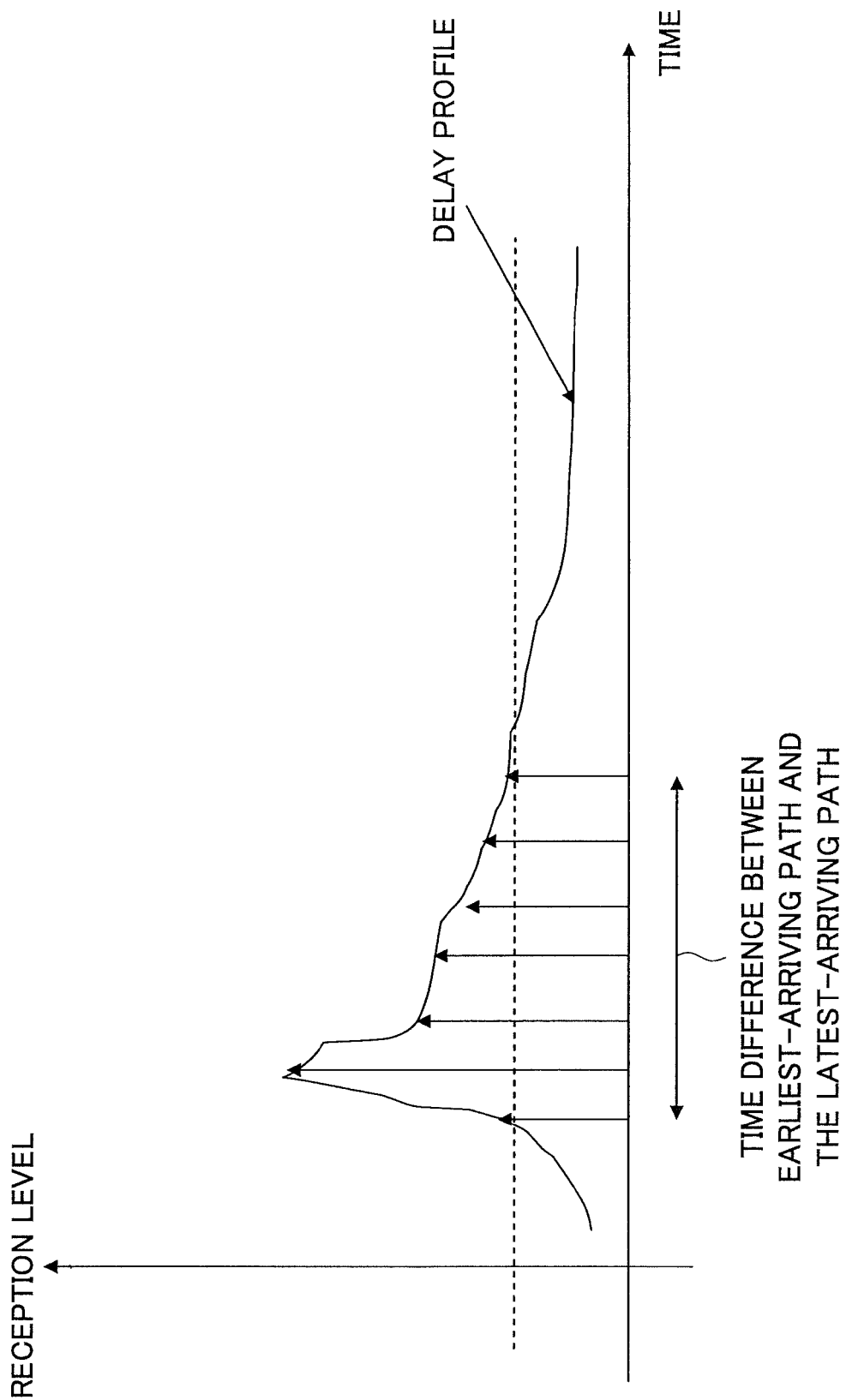
FIG. 10 is a graph used to describe an average delay profile calculation process at a baseband signal processing unit of a receiving apparatus according to an embodiment of the present invention.

For example, as shown in FIG. 10, the delay profile measuring unit 6088 selects paths with reception levels greater than or equal to a predetermined threshold from the paths constituting the delay profile, and calculates an expected CP length based on the time difference between the earliest-arriving path and the latest-arriving path in the selected paths. In E-UTRA, the length of a short cyclic prefix (CP) (may also be called a normal cyclic prefix) is 4.6875 μs and the length of a long cyclic prefix (CP) is 16.6666 μs. In this case, the delay profile measuring unit 6088, for example, determines that the long CP is optimum if the time difference between the earliest-arriving path and the latest-arriving path is greater than or equal to 4.6875 μs, and determines that the short CP is optimum if the time difference is less than 4.6875 μs.

Instead of calculating the expected CP length, the delay profile measuring unit 6088 may be configured to output the time difference between the earliest-arriving path and the latest-arriving path as an estimated propagation path delay. In this case, a user of a communication area evaluation tool according to an embodiment of the present invention can easily determine whether the short CP or the long CP is optimum based on the estimated propagation path delay.

Figure 11:
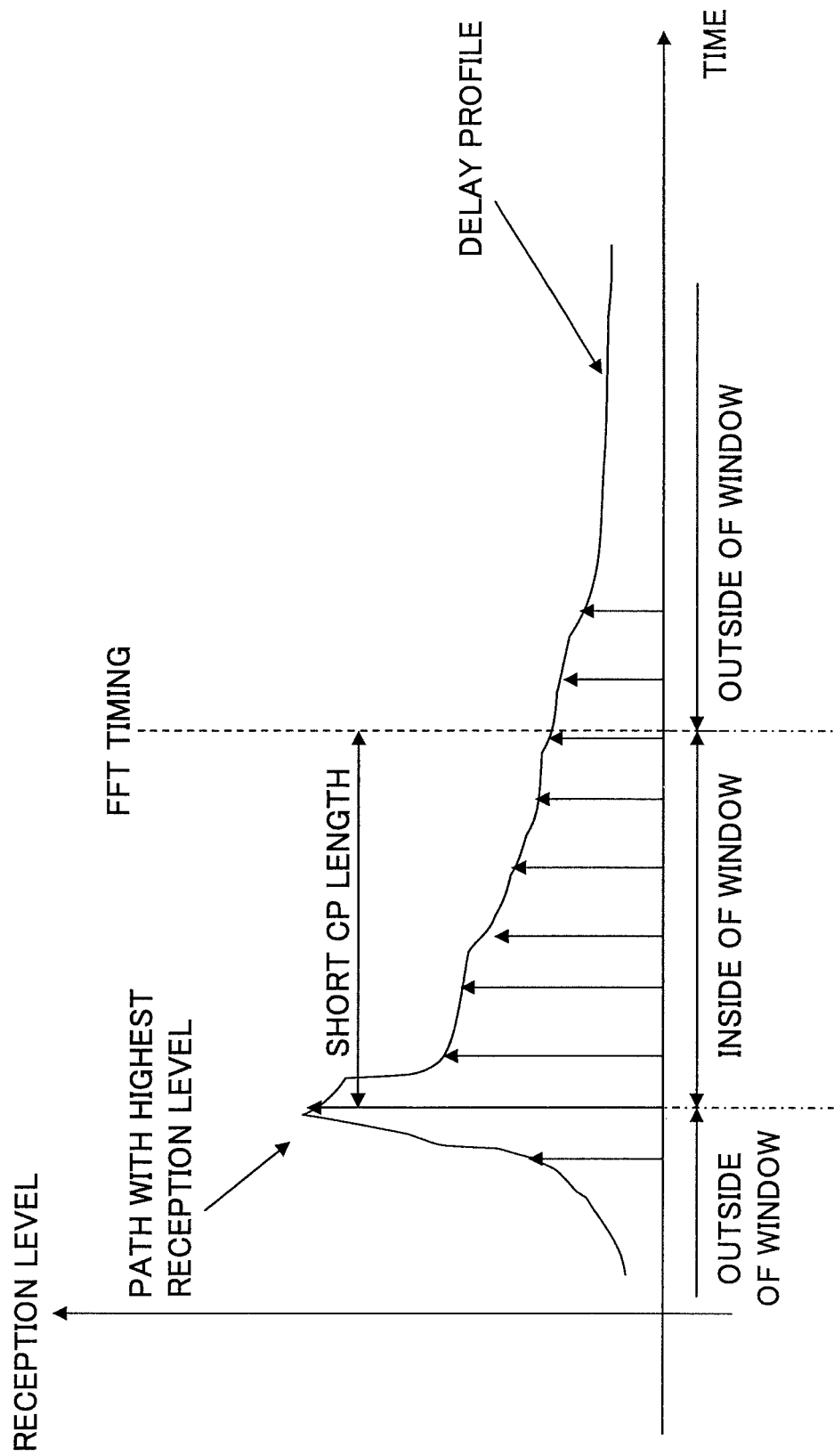
FIG. 11 is a graph used to describe an average delay profile calculation process at a baseband signal processing unit of a receiving apparatus according to an embodiment of the present invention.

Alternatively, as shown in FIG. 11, the delay profile measuring unit 6088 may be configured to define an FFT timing with respect to a path with the highest reception level and to calculate an expected CP length based on a ratio of the reception level in a window defined by the FFT timing and the short CP length to the reception level outside of the window. For example, the delay profile measuring unit 6088 may determine that the short CP is optimum if the ratio of the reception level in the window to the reception level outside of the window is greater than or equal to 10, and determines that the long CP is optimum if the ratio is less than 10.

The threshold for selecting paths and the ratio of the reception level in the window to the reception level outside of the window for determining the CP length may be provided as parameters in the receiving apparatus 600 or may be input from the outside via the external input/output unit 610. The threshold may be represented by an absolute value or a relative value. For example, the relative value may be indicated by a ratio of the received to the highest reception level. After calculations, the delay profile measuring unit 6088 inputs the expected CP length or the estimated propagation path delay to the external input/output unit 610.

The expected CP length or the estimated propagation path delay input to the external input/output unit 610 are output, for example, as graphs or numerical data to the outside (e.g., a monitor screen or a storage medium) as described later. Also, the expected CP length or the estimated propagation path delay may be output, for example, as graphs or numerical data to the outside (e.g., a monitor screen or a storage medium) together with the positional information of the receiving apparatus 600. Thus, the expected CP length or the estimated propagation path delay is output to the outside to allow a network operator (or a user, a device, or so on) to determine whether the CP length in the cell is appropriately set and to optimize parameters related to common channels such as the CP length for the cell 50.

The reference signal measuring unit 6089 receives the channel estimate and the downlink reference signal from the downlink reference signal receiving unit 6085. Based on the channel estimate and the downlink reference signal, the reference signal measuring unit 6089 calculates a received power level of the downlink reference signal (reference signal received power (RSRP)), a downlink received carrier power level (E-UTRA carrier received signal strength indicator (RSSI)) (may also be called downlink received power level), a value obtained by dividing the received power level of the downlink reference signal by the downlink received carrier power level (RSRP/RSSI), and a path loss. The value RSRP/RSSI may also be called reference signal received quality (RSRQ).

Here, the downlink received carrier power level is a sum of received power levels of all signals from the serving cell, i.e., the base station 200, received power levels of signals from all base stations in neighboring cells, received power levels of interference signals from neighboring frequencies, a thermal noise power level, and so on. See, for example, 3GPP TS36.214, v 1.0.0, 2007-05, for definitions of the reference signal received power (RSRP) and the E-UTRA carrier received signal strength indicator (RSSI).

The path loss is calculated based on the received power level of the downlink reference signal and the transmission power level of the downlink reference signal at the base station 200 as follows:

Path loss[dB]=(transmission power level of downlink reference signal)−(received power level of downlink reference signal)

The transmission power level of the downlink reference signal may be provided as a parameter in the receiving apparatus 600 or may be input from the outside via the external input/output unit 610. Also, the transmission power level of the downlink reference signal may be determined based on the information regarding the transmission power level of the downlink reference signal obtained from the P-BCH or the D-BCH. The information regarding the transmission power level of the downlink reference signal obtained from the P-BCH or the D-BCH is input from the data signal decoding unit 6084.

Meanwhile, if the receiving apparatus 600 includes two receiving antennas, the reception power level of the downlink reference signal and the downlink received carrier power level may be measured in one of the following three methods:

(1) Using a value measured at one of the two antennas (main antenna).

(2) Using an average of values measured at the two antennas.

(3) Using the sum of values measured at the two antennas.

The same method or different methods may be used for measuring the reception power level of the downlink reference signal and the downlink received carrier power level. In this case, the value RSRP/RSSI is obtained by dividing the received power level of the downlink reference signal by the downlink received carrier power level measured in one of the above three methods. Also, the path loss is calculated based on the received power level of the downlink reference signal calculated in one of the above three methods. The three methods may be provided as parameters in the receiving apparatus 600 or may be input from the outside via the external input/output unit 610.

The received power level of the downlink reference signal, the downlink received carrier power level, the value RSRP/RSSI, and the path loss may be represented by averages in the frequency domain and/or the time domain.

An average in the time domain may be calculated over an averaging period defined as a parameter. For example, an average may be calculated over an averaging period of 200 ms. Also, the average calculated over 200 ms may be filtered using the following formula to obtain a value $F_n$:

$$F_n = (1-a) \times F_{n-1} + a \times M_n$$

where, $F_n$: current value obtained by filtering
$F_{n-1}$: previous value obtained by filtering
a: filtering factor
$M_n$: average over 200 ms For example, the filtering factor "a" may be set at $\frac{1}{2}^{(k/2)}$ (k=0, 1, 2, . . . ). The averaging period and the filtering factor "a" may be provided as parameters in the receiving apparatus 600 or may be input from the outside via the external input/output unit 610.

Instead of averaging calculated values in the time domain as described above, calculated values may be averaged based on positional information of the receiving apparatus 600. For example, the received power level of the downlink reference signal, the downlink received carrier power level, the value RSRP/RSSI, and the path loss may be obtained by averaging calculated values over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

An average in the frequency domain may be calculated, as shown in FIG. 7, over the entire system frequency band, or over a center frequency band of 1.08 MHz located in the center of the system frequency band, i.e., including the center frequency of the system frequency band. In LTE, the center frequency band of 1.08 MHz is used to transmit a synchronization channel (SCH). An average may instead be calculated over each resource block, or more flexibly, over any frequency band specified in the system frequency band. Further, as shown in FIG. 8, an average may be calculated over each resource block group including multiple resource blocks. In the example of FIG. 8, one resource block group includes five resource blocks. Also, instead of an average, a sum of calculated values in a frequency domain may be used. The averaging interval (or range) in the frequency domain may be provided as a parameter in the receiving apparatus 600 or may be input from the outside via the external input/output unit 610. Also, a parameter indicating whether to use an average or a sum may be provided in the receiving apparatus 600 or may be input from the outside via the external input/output unit 610.

In addition to calculating the received power level of the downlink reference signal, the downlink received carrier power level, the value RSRP/RSSI, and the path loss based on the downlink reference signal transmitted from the base station 200, those values may also be calculated based on a downlink reference signal transmitted from a neighboring base station. Also, if each base station covers multiple sectors, the above calculations may be performed based on downlink reference signals transmitted from all sectors of the base station 200 and the neighboring base station. Further, the reference signal measuring unit 6089 may be configured to calculate the received power level of the downlink reference signal, the downlink received carrier power level, the value RSRP/RSSI, and the path loss based on reference signals from all base stations (or sectors) that the receiving apparatus 600 can receive.

After calculations, the reference signal measuring unit 6089 inputs the received power level of the downlink reference signal, the downlink received carrier power level, the value RSRP/RSSI, and the path loss to the external input/output unit 610.

The received power level of the downlink reference signal, the downlink received carrier power level, the value RSRP/RSSI, and the path loss input to the external input/output unit 610 are output, for example, as graphs or numerical data to the outside (e.g., a monitor screen or a storage medium) as described later. Also, the received power level of the downlink reference signal, the downlink received carrier power level, the value RSRP/RSSI, and the path loss may be output, for example, as graphs or numerical data to the outside (e.g., a monitor screen or a storage medium) together with the positional information of the receiving apparatus 600. Thus, the received power level of the downlink reference signal, the downlink received carrier power level, the value RSRP/RSSI, and the path loss are output to the outside to allow a network operator (or a user, a device, or so on) to determine the radio quality of a downlink reference signal in a cell. Generally, the received power level of the downlink reference signal, the downlink received carrier power level, the value RSRP/RSSI, and the path loss are used for mobile control such as handover and cell reselection. In short, the receiving apparatus 600 calculates the received power level of the downlink reference signal, the downlink received carrier power level, the value RSRP/RSSI, and the path loss for all base stations from which the receiving apparatus 600 can receive signals, and thereby makes it possible to evaluate mobile control characteristics of the radio communication system 1000.

The error rate obtaining unit 6090 receives the decoding results of the P-BCH, the D-BCH, the downlink scheduling information for the D-BCH, the PI, and the PCH from the data signal decoding unit 6084, and calculates their error rates. A measuring period for calculating the error rates is received from the external input/output unit 610. For example, if the measuring period received from the external input/output unit 610 indicates one second, the error rate obtaining unit 6090 calculates error rates of the P-BCH, the D-BCH, the downlink scheduling information for the D-BCH, the PI, and the PCH every one second. After calculations, the error rate obtaining unit 6090 inputs the error rates of the P-BCH, the D-BCH, the downlink scheduling information for the D-BCH, the PI, and the PCH to the external input/output unit 610.

Instead of calculating error rates every measuring period as described above, error rates may be calculated every measuring interval based on positional information of the receiving apparatus 600. For example, the error rates of the P-BCH, the D-BCH, the downlink scheduling information for the D-BCH, the PI, and the PCH may be calculated every measuring interval of 100 m, i.e., every 100-m movement of the receiving apparatus 600. A two-dimensional parameter such as 100 m$^2$ may be specified for the measuring interval instead of a one-dimensional parameter such as 100 m. The positional information is input via the external input/output unit 110. The measuring interval based on the positional information may be provided as a parameter in the receiving apparatus 600 or may be input from the outside via the external input/output unit 610.

The error rates of the P-BCH, the D-BCH, the downlink scheduling information for the D-BCH, the PI, and the PCH input to the external input/output unit 610 are output, for example, as graphs or numerical data to the outside (e.g., a monitor screen or a storage medium) as described later. Also, the error rates of the P-BCH, the D-BCH, the downlink scheduling information for the D-BCH, the PI, and the PCH may be output, for example, as graphs or numerical data to the outside (e.g., a monitor screen or a storage medium) together with the positional information of the receiving apparatus 600. Thus, the error rates of the P-BCH, the D-BCH, the downlink scheduling information for the D-BCH, the PI, and the PCH are output to the outside to allow a network operator (or a user, a device, or so on) to determine whether the quality of the common channels is appropriately maintained and to optimize parameters related to the common channels such as the transmission power and the number of resource elements allocated to the common channels. Instead of the number of resource elements, the number of resource blocks, the number of subcarriers, or the number of OFDM symbols may be optimized based on the error rates.

Figure 6:
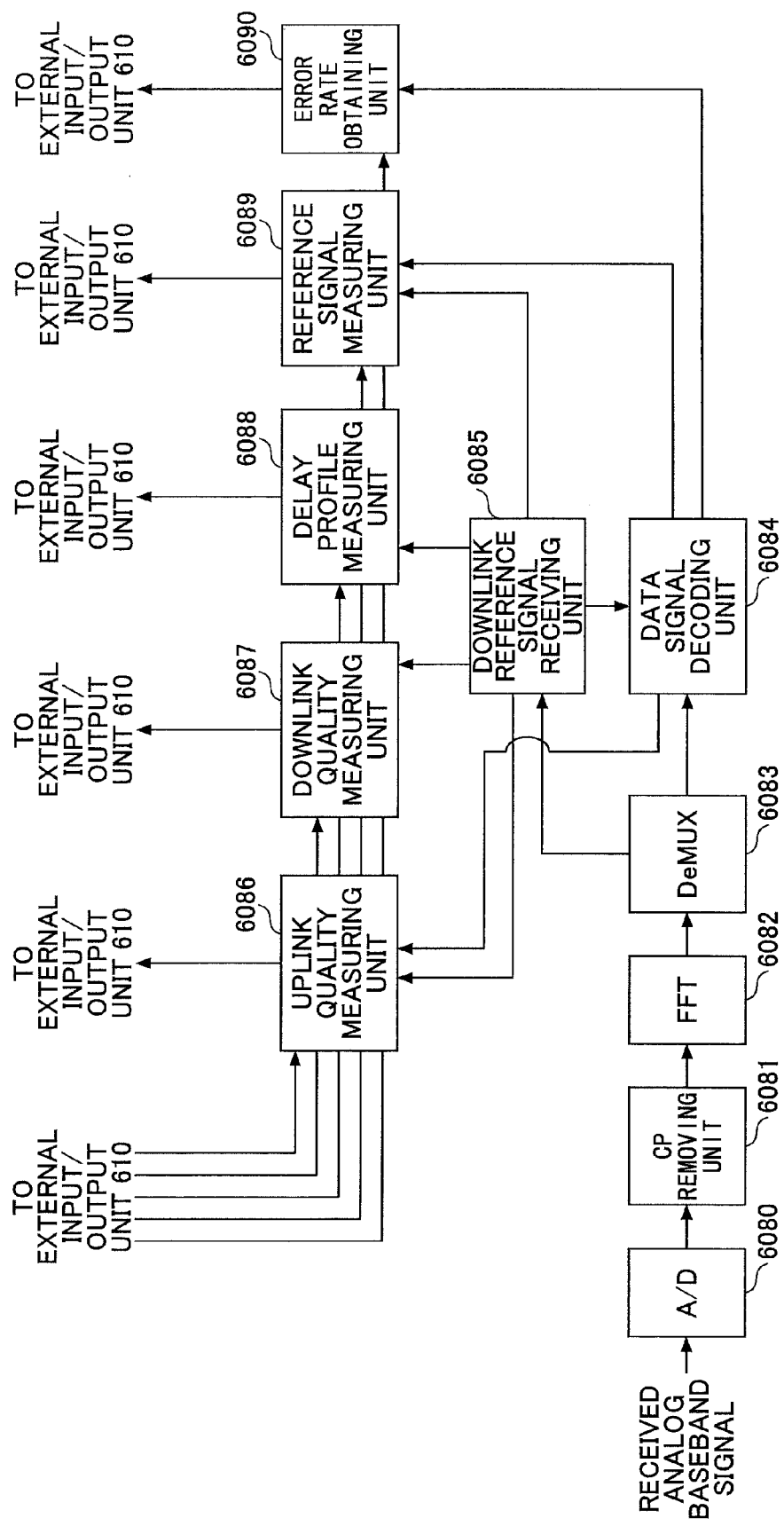
FIG. 6 is a block diagram illustrating a receiving unit of a baseband signal processing unit of a receiving apparatus according to an embodiment of the present invention.

In the above descriptions with reference to FIGS. 5 and 6, reception processing of a downlink signal transmitted from the base station 200 is mainly discussed. However, the receiving apparatus 600 can also perform similar reception processing for a downlink signal transmitted from a neighboring base station.

The external input/output unit 610 outputs calculated (measured) values received from the uplink quality measuring unit 6086, the downlink quality measuring unit 6087, the delay profile measuring unit 6088, the reference signal measuring unit 6089, and the error rate obtaining unit 6090 of the baseband signal processing unit 608 to external interfaces.

For example, the external input/output unit 610 displays the calculated values as numerical data and/or graphs on a monitor screen or stores the calculated values as numerical data in a storage medium such as a memory or a hard disk.

Also, the external input/output unit 610 may obtain positional information of the receiving apparatus 600 and output calculated (measured) values received from the uplink quality measuring unit 6086, the downlink quality measuring unit 6087, the delay profile measuring unit 6088, the reference signal measuring unit 6089, and the error rate obtaining unit 6090 to an external interface (e.g., a monitor screen or a storage medium) together with the positional information. The positional information may be obtained, for example, from a positional information obtaining device such as a GPS 700 connected to the external input/output unit 610.

When output together with the positional information, the calculated values from the uplink quality measuring unit 6086, the downlink quality measuring unit 6087, the delay profile measuring unit 6088, the reference signal measuring unit 6089, and the error rate obtaining unit 6090 may be represented by averages in the time domain or averages calculated based on the positional information.

Also, when the calculated values are averaged based on the positional information instead of in the time domain by the uplink quality measuring unit 6086, the downlink quality measuring unit 6087, the delay profile measuring unit 6088, the reference signal measuring unit 6089, and the error rate obtaining unit 6090, the positional information is obtained by the GPS 700 and input via the external input/output unit 610 to the respective units.

The external input/output unit 610 may also be configured to store parameters used by the uplink quality measuring unit 6086, the downlink quality measuring unit 6087, the delay profile measuring unit 6088, the reference signal measuring unit 6089, and the error rate obtaining unit 6090, and to input the parameters to the corresponding units. The parameters may be stored as internal parameters of the receiving apparatus 600 or may be input from an external interface. Details of the parameters are given in the above descriptions.

Next, data obtaining processes (methods) performed by the receiving apparatus 600 of this embodiment are described with reference to FIGS. 12 and 13. Below, a data obtaining process is described with reference to FIG. 12 and another data obtaining process where calculated values are averaged based on positional information is described with reference to FIG. 13.

Figure 12:
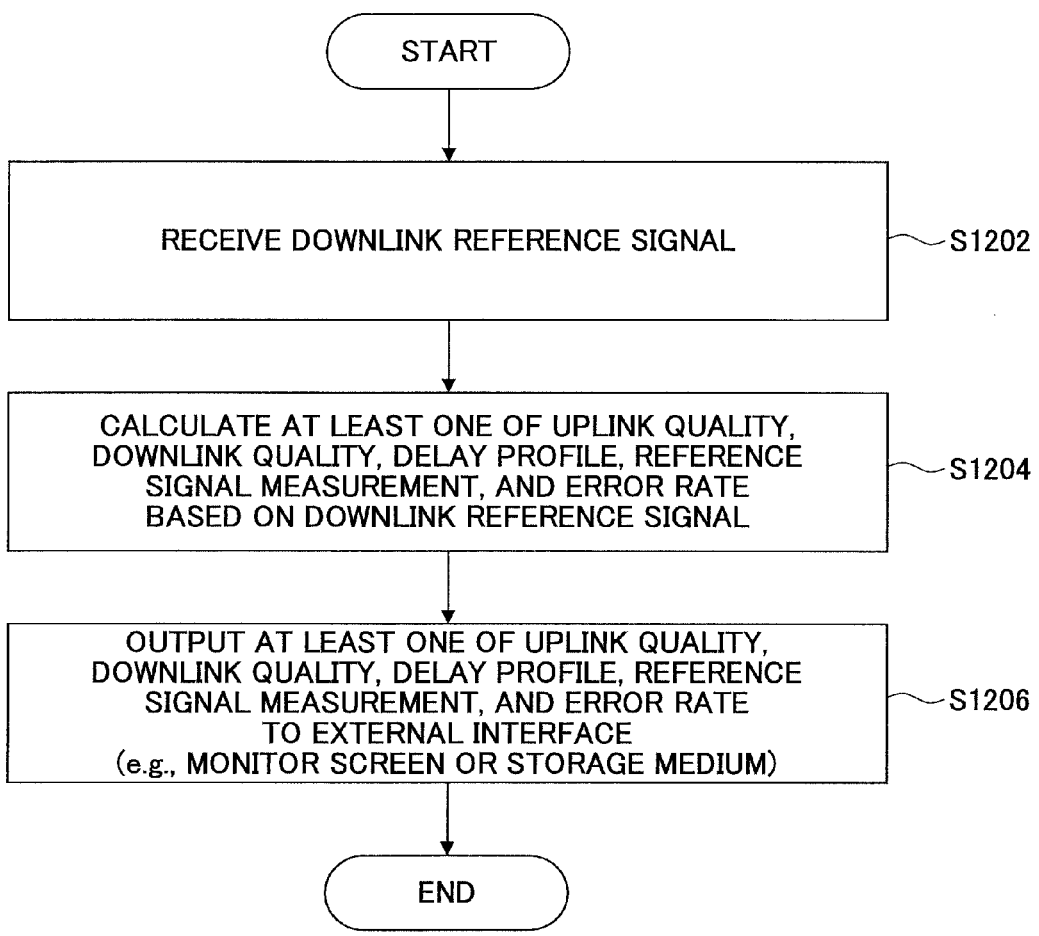
FIG. 12 is a flowchart showing a data obtaining process performed by a receiving apparatus according to an embodiment of the present invention.
Figure 13:
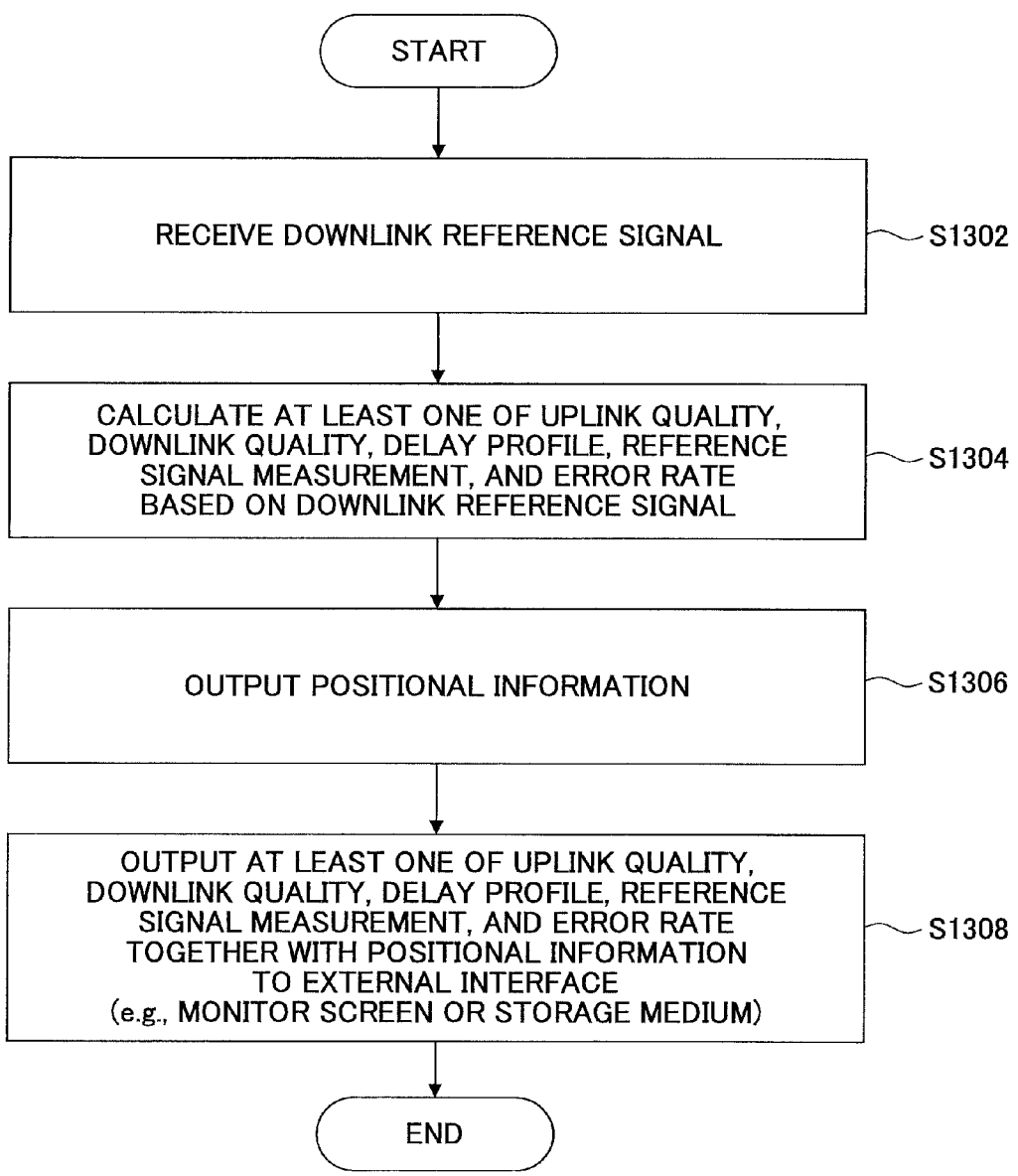
FIG. 13 is a flowchart showing a data obtaining process performed by a receiving apparatus according to an embodiment of the present invention.

Referring to FIG. 12, the receiving apparatus 600 receives a downlink reference signal transmitted from the base station 200 (step S1202).

Based on the received downlink reference signal, the receiving apparatus 600 calculates at least one of uplink quality, downlink quality, a delay profile, a reference signal measurement, and an error rate (step S1204). For example, the uplink quality measuring unit 6086, the downlink quality measuring unit 6087, the delay profile measuring unit 6088, the reference signal measuring unit 6089, and the error rate obtaining unit 6090 of the baseband signal processing unit 608 may retain parameters and calculate expected values based on the parameters and the downlink reference signal.

Then, the receiving apparatus 600 outputs at least one of the uplink quality, the downlink quality, the delay profile, the reference signal measurement, and the error rate calculated in step S1204 to an external interface such as a monitor screen or a storage medium (step S1206).

This makes it possible for a network operator (or a user, a device, or so on) to obtain at least one of the uplink quality, the downlink quality, the delay profile, the reference signal measurement, and the error rate output from the receiving apparatus 600. The expected values may be represented by averages in the time domain.

A data obtaining process where calculated values are averaged based on positional information is described below with reference to FIG. 13.

The receiving apparatus 600 receives a downlink reference signal transmitted from the base station 200 (step S1302).

Based on the received downlink reference signal, the receiving apparatus 600 calculates at least one of uplink quality, downlink quality, a delay profile, a reference signal measurement, and an error rate (step S1304). For example, the uplink quality measuring unit 6086, the downlink quality measuring unit 6087, the delay profile measuring unit 6088, the reference signal measuring unit 6089, and the error rate obtaining unit 6090 of the baseband signal processing unit 608 may retain parameters and calculate expected values based on the parameters and the downlink reference signal.

Positional information obtained by the GPS 700 is input via the external input/output unit 610 to the uplink quality measuring unit 6086, the downlink quality measuring unit 6087, the delay profile measuring unit 6088, the reference signal measuring unit 6089, and the error rate obtaining unit 6090. The uplink quality measuring unit 6086, the downlink quality measuring unit 6087, the delay profile measuring unit 6088, the reference signal measuring unit 6089, and/or the error rate obtaining unit 6090 output the calculated values together with the positional information (step S1306).

Then, the receiving apparatus 600 outputs at least one of the uplink quality, the downlink quality, the delay profile, the reference signal measurement, and the error rate calculated in step S1304 together with the positional information to an external interface such as a monitor screen or a storage medium (step S1308).

This makes it possible for a network operator (or a user, a device, or so on) to obtain at least one of the uplink quality, the downlink quality, the delay profile, the reference signal measurement, and the error rate represented by averages calculated based on the positional information.

Figure 14:
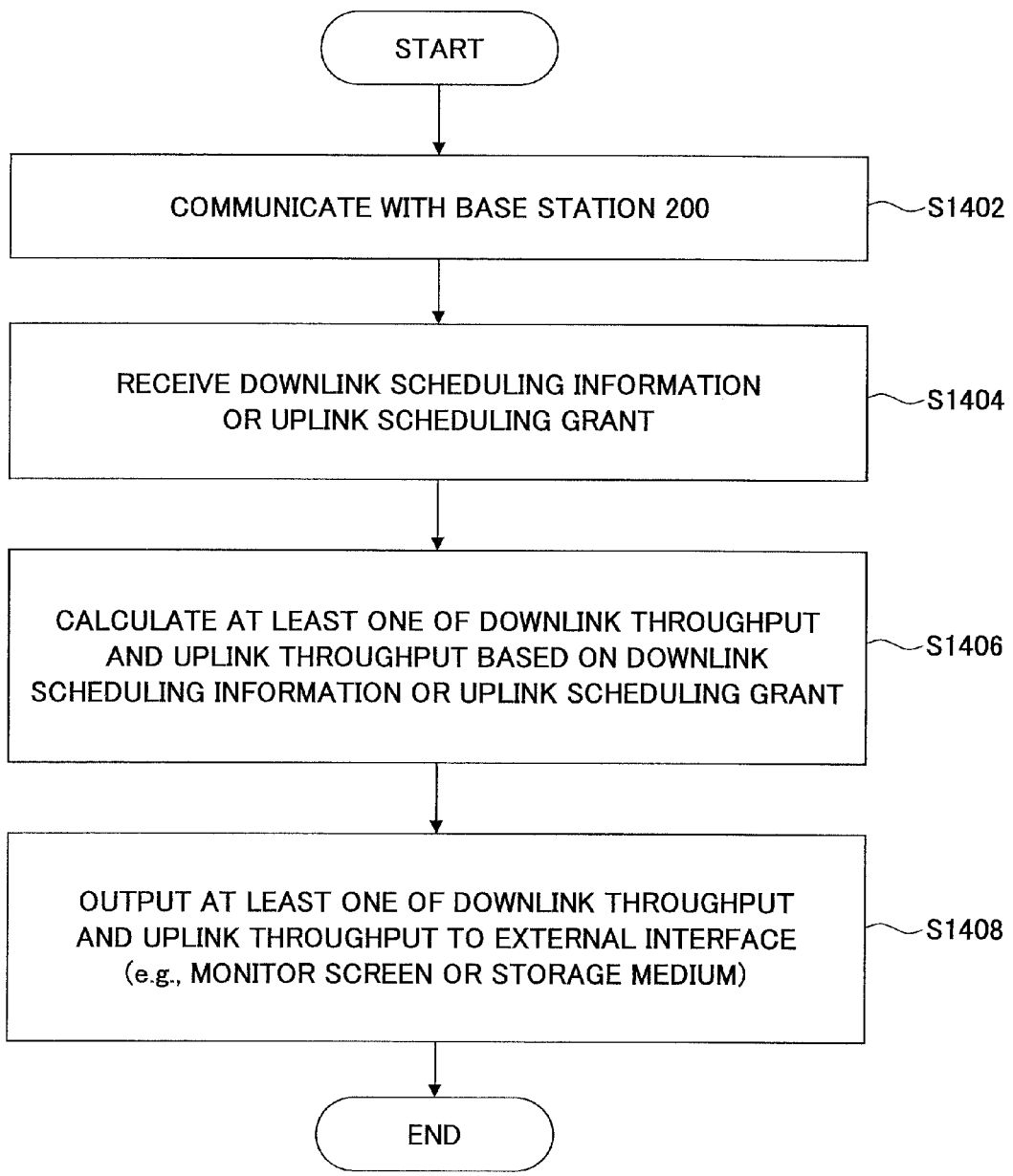
FIG. 14 is a flowchart showing a data obtaining process performed by a receiving apparatus according to an embodiment of the present invention.
Figure 15:
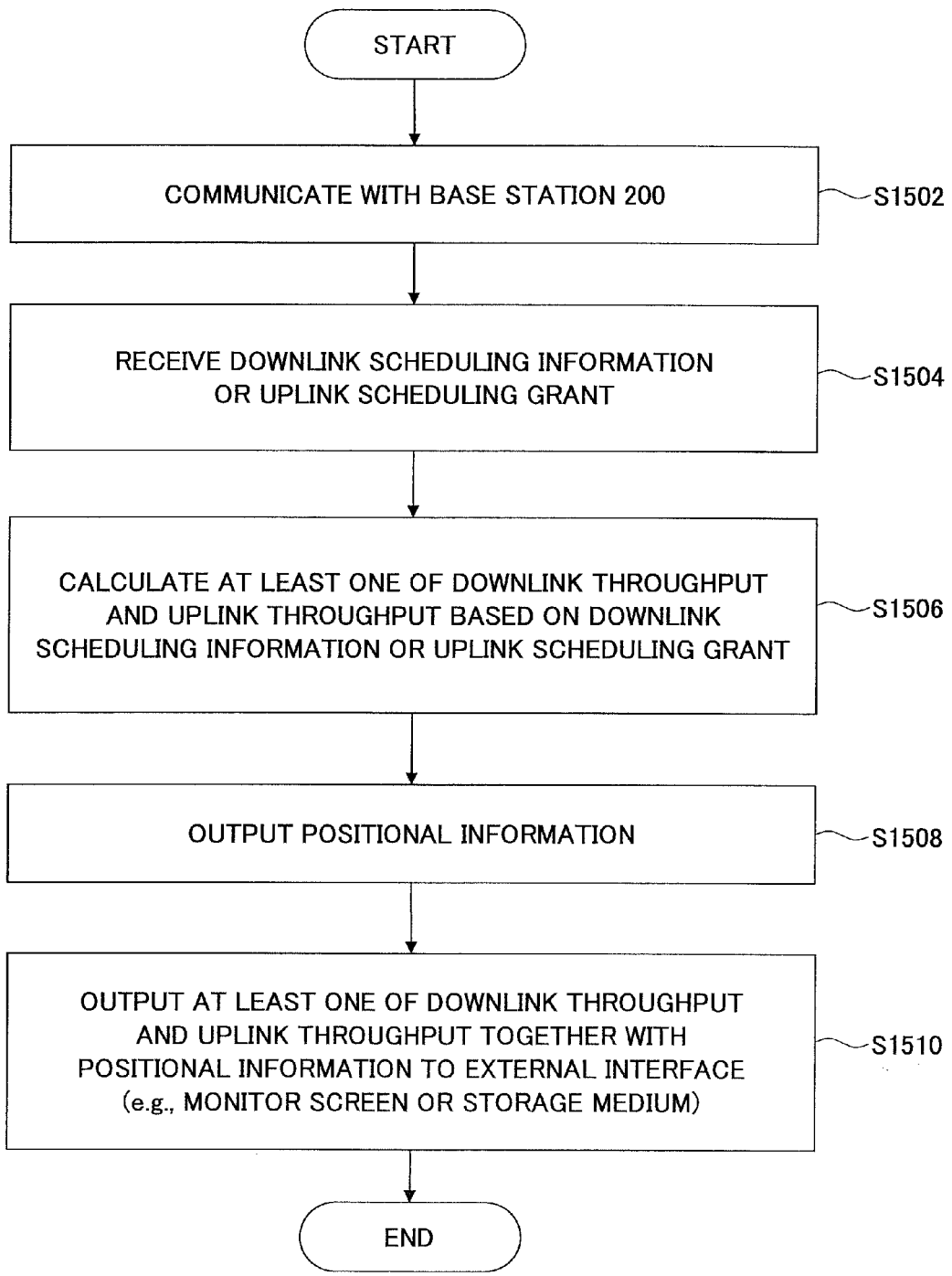
FIG. 15 is a flowchart showing a data obtaining process performed by a receiving apparatus according to an embodiment of the present invention.

Other data obtaining processes (methods) performed by the receiving apparatus 600 of this embodiment are described with reference to FIGS. 14 and 15. Here, it is assumed that the receiving apparatus 600 communicates with the base station 200 and measures a throughput based on downlink scheduling information or an uplink scheduling grant. Below, a data obtaining process is described with reference to FIG. 14, and another data obtaining process where calculated values are averaged based on positional information is described with reference to FIG. 15.

The receiving apparatus 600 communicates with the base station 200 (step S1402).

The receiving apparatus 600 receives downlink scheduling information or an uplink scheduling grant transmitted from the base station 200 (step S1404).

Based on the received downlink scheduling information or uplink scheduling grant, the receiving apparatus 600 calculates at least one of a downlink throughput and an uplink throughput (step S1406).

Then, the receiving apparatus 600 outputs at least one of the downlink throughput and the uplink throughput calculated in step S1406 to an external interface such as a monitor screen or a storage medium (step S1408).

This makes it possible for a network operator (or a user, a device, or so on) to obtain at least one of the downlink throughput and the uplink throughput output from the receiving apparatus 600. The downlink throughput and the uplink throughput may be represented by averages in the time domain.

A data obtaining process where calculated values are averaged based on positional information is described below with reference to FIG. 15.

The receiving apparatus 600 communicates with the base station 200 (step S1502).

The receiving apparatus 600 receives downlink scheduling information or an uplink scheduling grant transmitted from the base station 200 (step S1504).

Based on the received downlink scheduling information or uplink scheduling grant, the receiving apparatus 600 calculates at least one of a downlink throughput and an uplink throughput (step S1506).

Positional information obtained by the GPS 700 is input via the external input/output unit 610 to the uplink quality measuring unit 6086, the downlink quality measuring unit 6087, the delay profile measuring unit 6088, the reference signal measuring unit 6089, and the error rate obtaining unit 6090. The uplink quality measuring unit 6086, the downlink quality measuring unit 6087, the delay profile measuring unit 6088, the reference signal measuring unit 6089, and/or the error rate obtaining unit 6090 output calculated values together with the positional information (step S1508).

Then, the receiving apparatus 600 outputs at least one of the downlink throughput and the uplink throughput calculated in step S1506 together with the positional information to an external interface such as a monitor screen or a storage medium (step S1510).

This makes it possible for a network operator (or a user, a device, or so on) to obtain at least one of the downlink throughput and the uplink throughput that is represented by an average calculated based on the positional information.

This embodiment makes it possible to obtain values such as an expected downlink throughput and an expected uplink throughput to be used by a network operator for cell design, and thereby makes it possible to construct a high-quality, highly-efficient network.

Second Embodiment

A receiving apparatus for communication area evaluation according to another embodiment of the present invention is described below.

In this embodiment, it is assumed that multiple base stations in the radio communication system 1000 perform downlink transmission in synchronization with each other. A network where multiple base stations perform downlink transmission in synchronization with each other (hereafter, such base stations may be called "downlink-transmission-synchronized base stations") is called a single frequency network (SFN) or a multicast/broadcast over single frequency network (MBSFN).

In the MBSFN, when, for example, the same signal is transmitted from multiple downlink-transmission-synchronized base stations, the mobile station can comparatively easily combine multiple instances of the signal transmitted from the base stations. This in turn makes it possible to improve the transmission efficiency and the transmission rate. This technology is particularly effective in multicast and broadcast transmission where a common signal is transmitted from base stations to an unspecified number of mobile stations.

A radio communication system 1000 including a receiving apparatus 600 and base stations 200 of this embodiment is described below with reference to FIG. 16.

The radio communication system 1000 is based on, for example, Evolved UTRA and UTRAN. The radio communication system 1000 includes the base stations $200_m$ ($200_1$, $200_2$, $200_3$, $200_4$, $200_5$, $200_6$, $200_7$, ..., $200_m$; where m is an integer greater than 0), mobile stations $100_n$ ($100_1$, $100_2$, $100_3$ ... $100_n$; where n is an integer greater than 0), and the receiving apparatus 600 located in one of cells $50_l$ ($50_1$, $50_2$, $50_3$, ..., $50_l$; where l is an integer greater than 0) that are areas where mobile communication services are provided by the base stations $200_m$.

Figure 16:
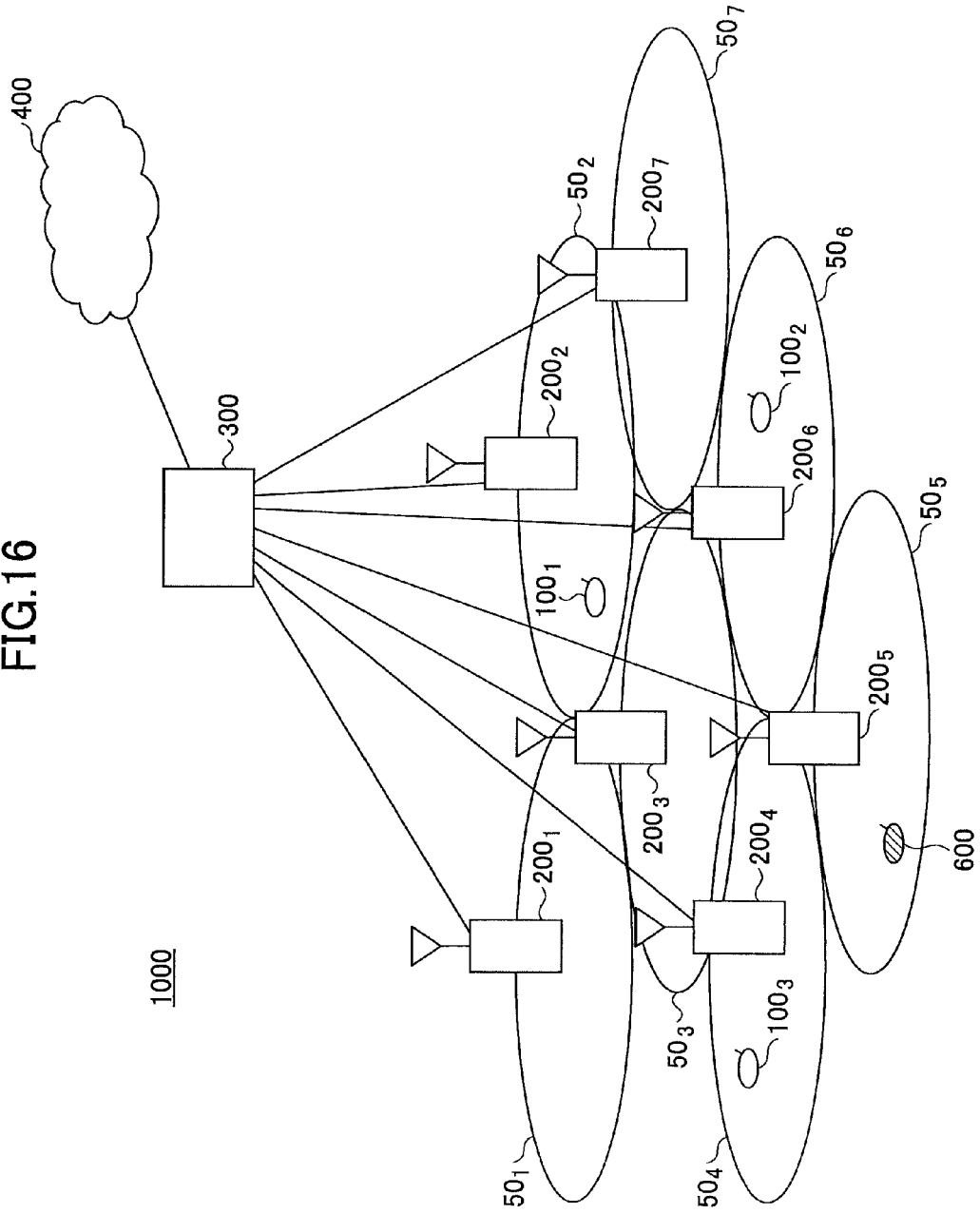
FIG. 16 is a drawing illustrating a configuration of a radio communication system according to an embodiment of the present invention.

In FIG. 16, for brevity, only one sector is shown for each of the base stations $200_m$. However, each of the base stations $200_m$ may have two or more sectors.

The receiving apparatus 600 may or may not be communicating with the base stations $200_m$ based on Evolved UTRA and UTRAN. When the receiving apparatus 600 communicates with the base stations $200_m$ based on Evolved UTRA and UTRAN, communication processing similar to that performed between the mobile stations $100_n$ and the base stations $200_m$ is performed between the receiving apparatus 600 and the base stations $200_m$.

The receiving apparatus 600 of this embodiment has substantially the same configuration as that of the first embodiment except the configuration of the baseband signal processing unit 108. Therefore, the baseband signal processing unit 108 of this embodiment is mainly described below.

Figure 17:
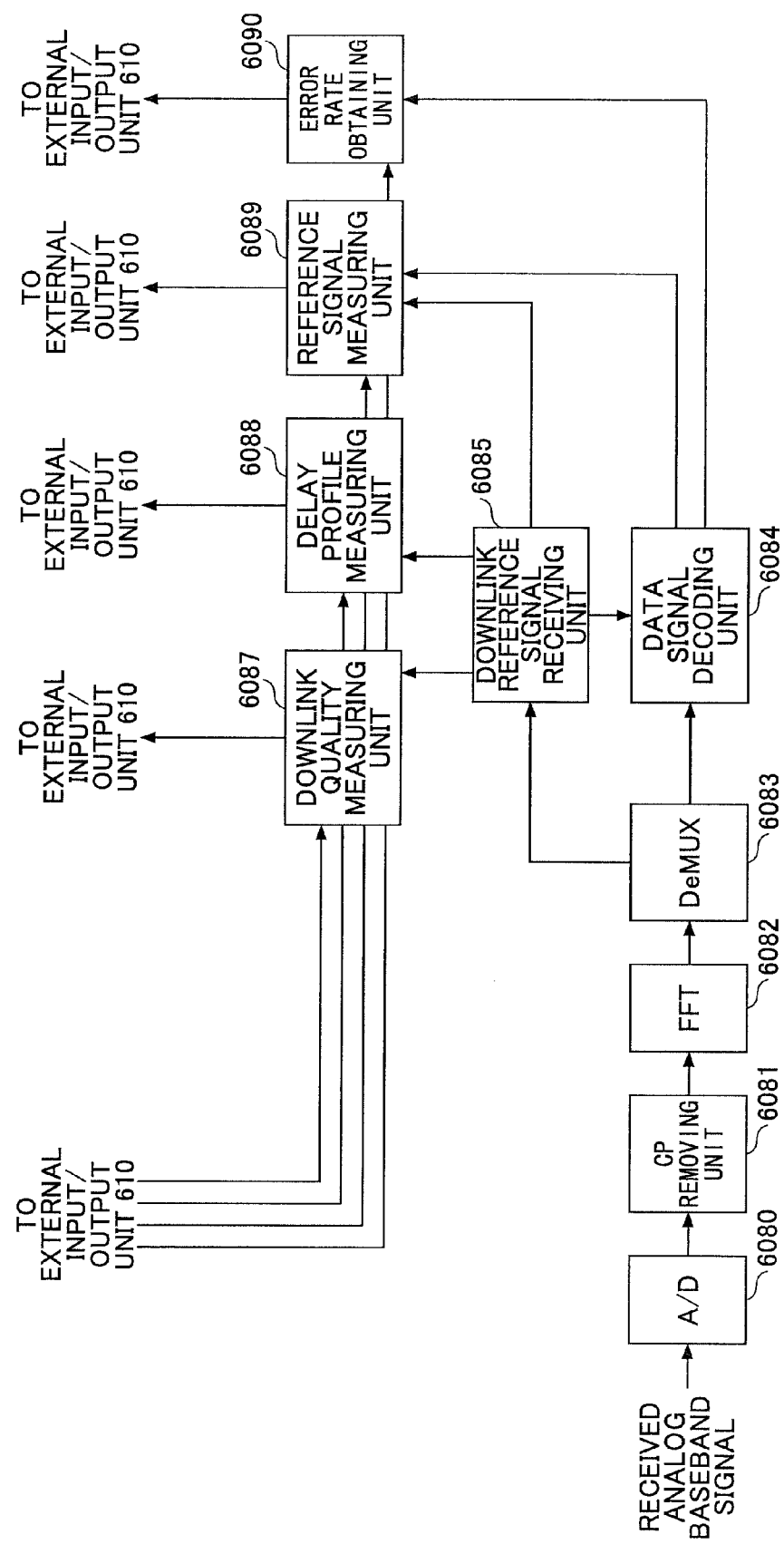
FIG. 17 is a block diagram illustrating a receiving unit of a baseband signal processing unit of a receiving apparatus according to an embodiment of the present invention.

As shown in FIG. 17, the baseband signal processing unit 108 of the receiving apparatus 600 of this embodiment includes an analog-to-digital conversion unit (A/D) 6080, a CP removing unit 6081, a fast Fourier transform unit (FFT) 6082, a demultiplexing unit (DeMUX) 6083, a data signal decoding unit 6084, a downlink reference signal receiving unit 6085, a downlink quality measuring unit 6087, a delay profile measuring unit 6088, a reference signal measuring unit 6089, and an error rate obtaining unit 6090.

The functions of the analog-to-digital conversion unit (A/D) 6080, the CP removing unit 6081, the fast Fourier transform unit (FFT) 6082, and the demultiplexing unit (DeMUX) 6083 are substantially the same as those of the first embodiment. In the second embodiment, unlike the first embodiment where a downlink signal transmitted from one base station is input from the transceiver unit 606, a downlink signal input from the transceiver unit 606 includes signals transmitted from multiple downlink-transmission-synchronized base stations. Here, it is assumed that the receiving apparatus 600 cannot identify base stations transmitting signals included in the downlink signal.

The data signal decoding unit 6084 receives a channel estimate from the downlink reference signal receiving unit 6085, and applies channel compensation based on the channel estimate to a downlink data signal transmitted from multiple downlink-transmission-synchronized base stations to decode the data signal. Here, the data signal indicates a common channel signal transmitted from the downlink-transmission-synchronized base stations. The common channel signal, for example, includes common channels such as a P-BCH, a D-BCH, a broadcast channel, and a multicast channel. After decoding the data signal, the data signal decoding unit 6084 reports the decoding results to the error rate obtaining unit 6090.

Also, the data signal decoding unit 6084 obtains information in the P-BCH and the D-BCH, and inputs the obtained information to relevant components of the receiving apparatus 600 as needed. For example, the data signal decoding unit 6084 obtains information regarding the transmission power level of a downlink reference signal from the P-BCH or the D-BCH, and inputs the obtained information to the reference signal measuring unit 6089.

The downlink reference signal receiving unit 6085 performs channel estimation based on the downlink reference signal and determines channel compensation to be applied to the received data signal. In other words, the downlink reference signal receiving unit 6085 calculates a channel estimate. The downlink reference signal receiving unit 6085 inputs the calculated channel estimate to the data signal decoding unit 6084. The downlink reference signal receiving unit 6085 also inputs the downlink reference signal and the channel estimate to the downlink quality measuring unit 6087, the delay profile measuring unit 6088, the reference signal measuring unit 6089, and the error rate obtaining unit 6090. Here, it is assumed that the downlink reference signal is transmitted from the multiple downlink-transmission-synchronized base stations.

The functions of the downlink quality measuring unit 6087, the delay profile measuring unit 6088, and the reference signal measuring unit 6089 are substantially the same as those of the first embodiment, and therefore descriptions of those functions are omitted here. In the second embodiment, unlike the first embodiment where a downlink reference signal transmitted from one base station is input from the downlink reference signal receiving unit 6085, the downlink reference signal input from the downlink reference signal receiving unit 6085 is transmitted from multiple downlink-transmission-synchronized base stations.

The error rate obtaining unit 6090 receives decoding results of the P-BCH, the D-BCH, the multicast channel, and the broadcast channel from the data signal decoding unit 6084, and calculates their error rates. A measuring period for calculating the error rates is received from the external input/output unit 610. For example, if the measuring period received from the external input/output unit 610 indicates one second, the error rate obtaining unit 6090 calculates error rates of the P-BCH, the D-BCH, the multicast channel, and the broadcast channel every one second. After calculations, the error rate obtaining unit 6090 inputs the error rates of the P-BCH, the D-BCH, the multicast channel, and the broadcast channel to the external input/output unit 610.

Instead of calculating error rates every measuring period as described above, error rates may be calculated every measuring interval based on positional information of the receiving apparatus 600. For example, the error rates of the P-BCH, the D-BCH, the multicast channel, and the broadcast channel may be calculated every measuring interval of 100 m, i.e., every 100-m movement of the receiving apparatus 600. A two-dimensional parameter such as 100 m$^2$ may be specified for the measuring interval instead of a one-dimensional parameter such as 100 m. The positional information is input via the external input/output unit 610. The measuring interval based on the positional information may be provided as a parameter in the receiving apparatus 600 or may be input from the outside via the external input/output unit 610.

The error rates of the P-BCH, the D-BCH, the multicast channel, and the broadcast channel input to the external input/output unit 610 are output, for example, as graphs or numerical data to the outside (e.g., a monitor screen or a storage medium). Also, the error rates of the P-BCH, the D-BCH, the multicast channel, and the broadcast channel may be output, for example, as graphs or numerical data to the outside (e.g., a monitor screen or a storage medium) together with the positional information of the receiving apparatus 600. Thus, the error rates of the P-BCH, the D-BCH, the multicast channel, and the broadcast channel are output to the outside to allow a network operator (or a user, a device, or so on) to determine whether the quality of the common channels is appropriately maintained and to optimize parameters related to the common channels such as the transmission power and the number of resource elements allocated to the common channels. Instead of the number of resource elements, the number of resource blocks, the number of subcarriers, or the number of OFDM symbols may be optimized based on the error rates.

Third Embodiment

In the first embodiment, basically, the receiving apparatus 600 receives a downlink reference signal, performs various measurements and calculations, and outputs the results to an external interface.

With the receiving apparatus 600 of the first embodiment, however, it is difficult to accurately calculate the received SIR of an uplink signal at the base station 200 and therefore it is difficult to accurately calculate an expected uplink throughput. Also, since the receiving apparatus 600 of the first embodiment is not informed of the operations of a scheduler (MAC processing unit) of the base station 200, the expected downlink throughput calculated by the receiving apparatus 600 may not always match the actual downlink throughput.

In this embodiment, to solve or reduce the above problems, the receiving apparatus 600 establishes a connection with the base station 200 and performs uplink and downlink communications with the base station 200. This configuration makes it possible to accurately calculate an expected uplink throughput and an expected downlink throughput. More particularly, the receiving apparatus 600 of this embodiment receives the uplink scheduling grant and the downlink scheduling information from the base station 200 and calculates an expected uplink throughput and an expected downlink throughput based on the received uplink scheduling grant and downlink scheduling information.

The uplink scheduling grant, for example, includes information regarding an uplink shared channel such as uplink resource allocation information, a UE ID(s), a data size(s), a modulation scheme(s), uplink transmission power information, and information regarding a demodulation reference signal used in uplink MIMO. Receiving the uplink scheduling grant makes it possible to calculate an expected uplink throughput based on the uplink resource allocation information and the data size.

The downlink scheduling information, for example, includes information regarding a downlink shared channel such as downlink resource block allocation information, a UE ID(s), the number of streams, information regarding a precoding vector(s), a data size(s), a modulation scheme(s), and information regarding hybrid automatic repeat request (HARQ). Receiving the downlink scheduling information makes it possible to calculate an expected downlink throughput based on the downlink resource block allocation information, the data size, and the number of streams.

Details of the third embodiment are described below.

The base station 200 of this embodiment has substantially the same configuration as that of the first embodiment, and therefore its descriptions are omitted here.

A receiving apparatus 600 of this embodiment is described below with reference to FIG. 18. The receiving apparatus 600 of this embodiment establishes a connection and communicates with the base station 200, and thereby calculates and outputs uplink and downlink communication quality. This feature of the receiving apparatus 600 is mainly discussed below.

Figure 18:
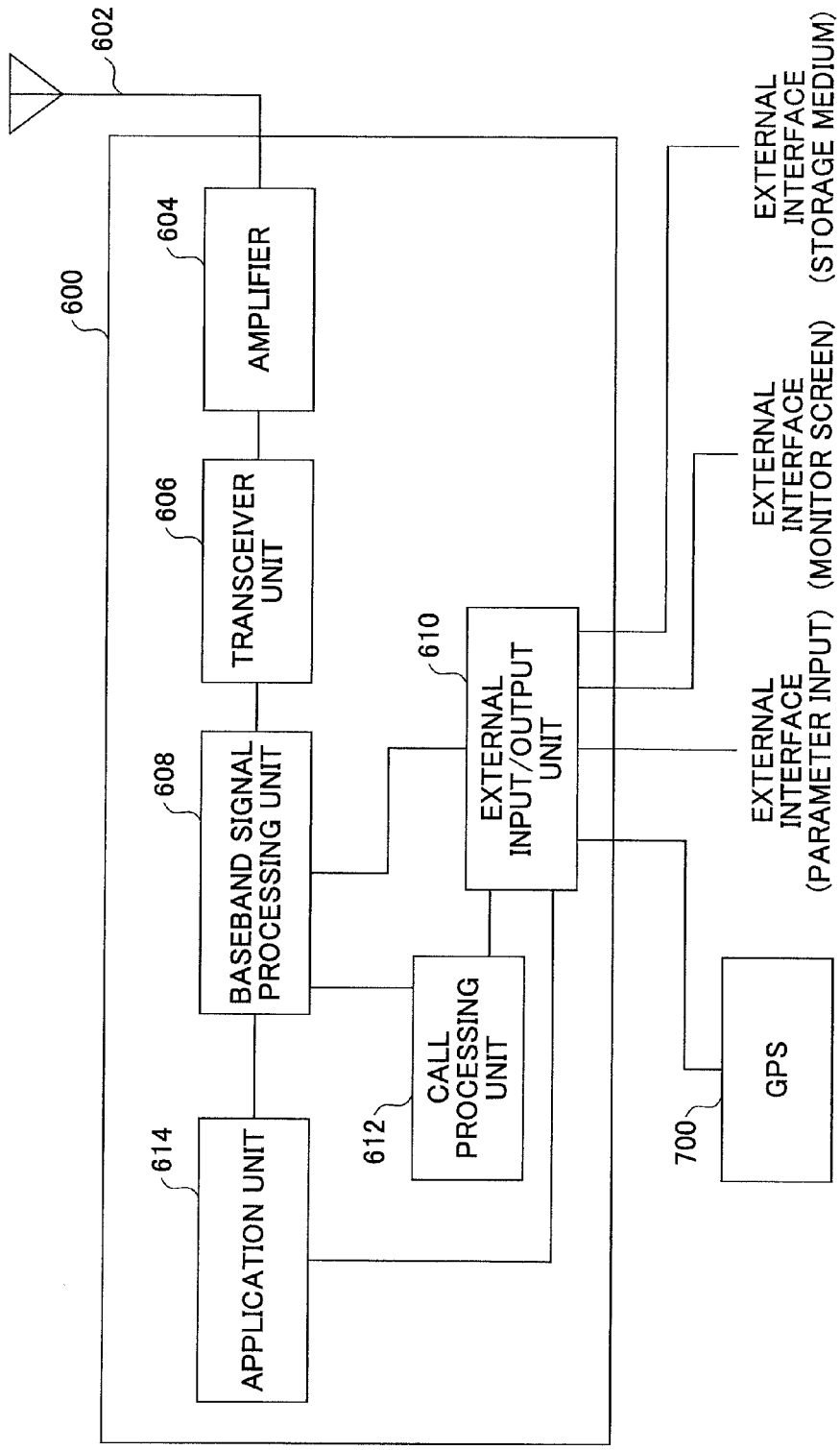
FIG. 18 is a block diagram of a receiving apparatus according to an embodiment of the present invention.

As shown in FIG. 18, the receiving apparatus 600 of this embodiment includes an antenna 602, an amplifier 604, a transceiver unit 606, a baseband signal processing unit 608, an external input/output unit 610, a call processing unit 612, and an application unit 614.

The antenna 602, the amplifier 604, and the transceiver unit 606 of this embodiment have substantially the same configurations and functions as those of the first embodiment, and therefore their descriptions are omitted here.

Figure 19:
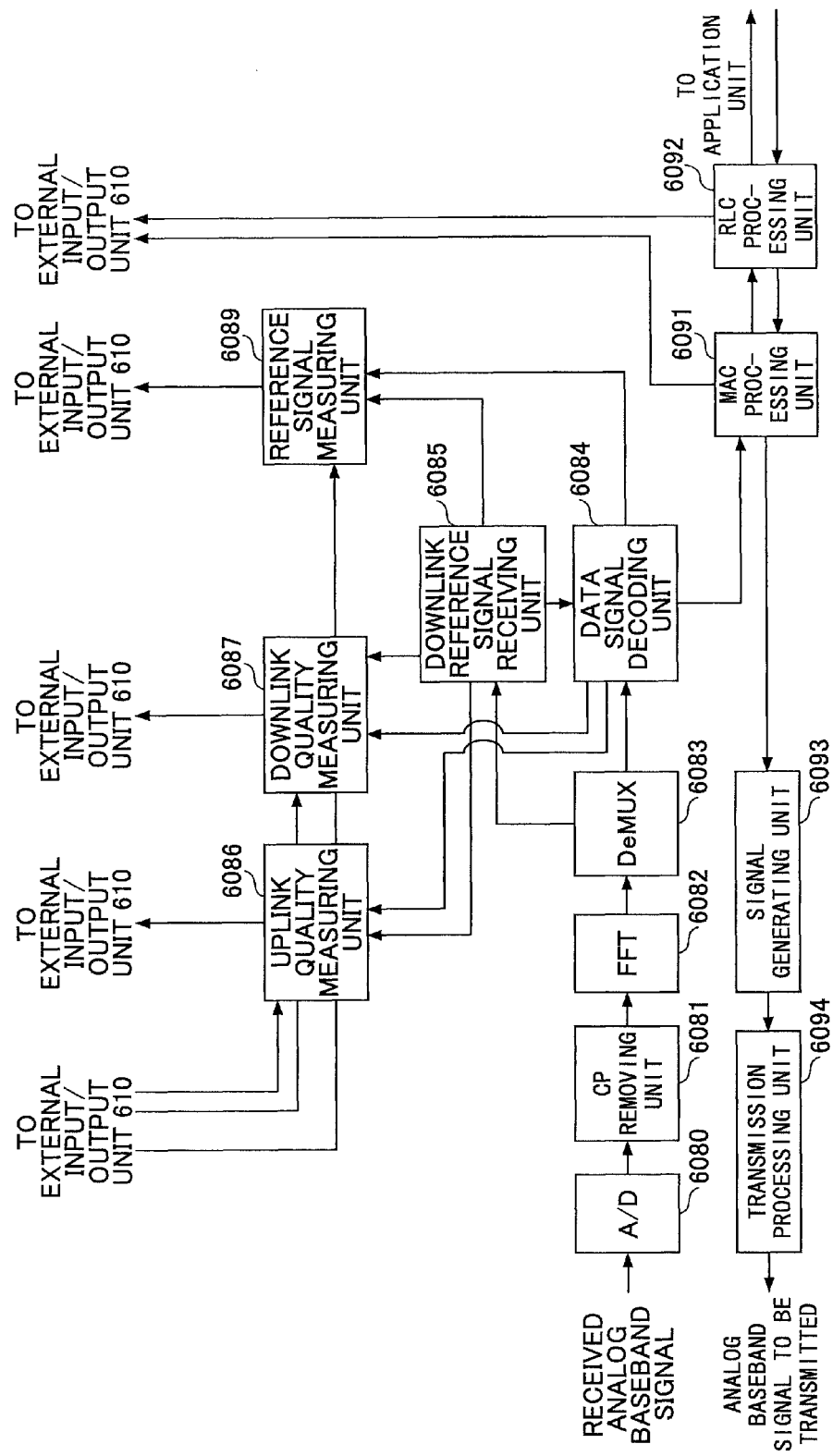
FIG. 19 is a block diagram illustrating a receiving unit of a baseband signal processing unit of a receiving apparatus according to an embodiment of the present invention.

A configuration of the baseband signal processing unit 608 of this embodiment is described below with reference to FIG. 19.

The baseband signal processing unit 608 includes an analog-to-digital conversion unit (A/D) 6080, a CP removing unit 6081, an FFT 6082, a DeMUX 6083, a data signal decoding unit 6084, a downlink reference signal receiving unit 6085, an uplink quality measuring unit 6086, a downlink quality measuring unit 6087, a reference signal measuring unit 6089, a MAC processing unit 6091, an RLC processing unit 6092, a signal generating unit 6093, and a transmission processing unit 6094.

The analog-to-digital conversion unit (A/D) 6080 converts an analog baseband signal input from the transceiver unit 606 into a digital signal and inputs the digital signal to the CP removing unit 6081.

The CP removing unit 6081 removes CPs from received symbols and inputs remaining effective symbols to the FFT 6082.

The fast Fourier transform unit (FFT) 6082 fast-Fourier-transforms the input signal and thereby OFDM-demodulates the signal, and inputs the demodulated signal to the DeMUX 6083.

The demultiplexing unit (DeMUX) 6083 separates a downlink reference signal, a broadcast channel signal, a downlink control channel signal, and a downlink shared channel signal from the demodulated signal, inputs the downlink reference signal to the downlink reference signal receiving unit 6085, and inputs the broadcast channel signal, the downlink control channel signal, and the downlink shared channel signal to the data signal decoding unit 6084.

The downlink reference signal receiving unit 6085 performs channel estimation based on the downlink reference signal and determines channel compensation to be applied to a received downlink data signal. In other words, the downlink reference signal receiving unit 6085 calculates a channel estimate. The downlink reference signal receiving unit 6085 inputs the calculated channel estimate to the data signal decoding unit 6084. The downlink reference signal receiving unit 6085 also inputs the downlink reference signal and the channel estimate to the uplink quality measuring unit 6086, the downlink quality measuring unit 6087, and the reference signal measuring unit 6089.

The data signal decoding unit 6084 receives the channel estimate from the downlink reference signal receiving unit 6085, and applies channel compensation based on the channel estimate to the downlink data signal received from the base station 200 to decode the downlink data signal. Here, the data signal includes the broadcast channel signal, the downlink control channel signal, and the downlink shared channel signal transmitted from the base station 200. The broadcast channel signal includes broadcast channels such as the P-BCH and the D-BCH. The downlink control channel signal includes downlink control channels such as the downlink scheduling information, the uplink scheduling grant, and acknowledgement information for an uplink shared channel. After decoding the data signal, the data signal decoding unit 6084 reports the decoding results to the uplink quality measuring unit 6086, the downlink quality measuring unit 6087, and the MAC processing unit 6091.

Also, the data signal decoding unit 6084 obtains information from the P-BCH and the D-BCH, and inputs the obtained information to relevant components of the receiving apparatus 600 as needed. For example, the data signal decoding unit 6084 may obtain information regarding the transmission power level of the downlink reference signal from the P-BCH or the D-BCH, and input the obtained information to the uplink quality measuring unit 6086 and the reference signal measuring unit 6089. As another example, the data signal decoding unit 6084 may obtain information (P0) regarding uplink transmission power control from the P-BCH or the D-BCH, and input the obtained information to the uplink quality measuring unit 6086.

The uplink quality measuring unit 6086 receives the channel estimate and the downlink reference signal from the downlink reference signal receiving unit 6085, and receives the decoding results of the downlink data signal from the data signal decoding unit 6084.

Below, functions of the uplink quality measuring unit 6086 of this embodiment not included in the uplink quality measuring unit 6086 of the first embodiment are described.

The uplink quality measuring unit 6086 calculates an expected uplink throughput based on the uplink resource allocation information and the data size obtained from the uplink scheduling grant in the data signal. The uplink resource allocation information indicates frequency resource allocation information. For example, the uplink quality measuring unit 6086 calculates an expected throughput per resource block as follows:

Expected throughput[bits/second]=data size[bits]× 1000/number of resource blocks Here, it is assumed that one subframe is 1 ms and therefore the data size is multiplied by 1000.

As in the first embodiment, the expected uplink throughput may be represented by an average in the time domain and/or the frequency domain. Also, the expected uplink throughput may be represented by an average calculated based on positional information.

Instead of calculating an expected throughput per resource block as in the above example, an expected throughput may be calculated based on resource allocation information in the frequency domain and/or the time domain. For example, an expected throughput may be calculated based on the frequency (or the rate) at which the uplink scheduling grant is actually transmitted and an actually-allocated transmission band, or based on an assumption that all frequency and time resources are allocated to the receiving apparatus 600. Further, an expected throughput may be calculated based on hypothetical frequency and time resources (allocation frequency) input from the outside via the external input/output unit 610.

In this embodiment, as described above, the receiving apparatus 600 is in communication with the base station 200. Therefore, the uplink quality measuring unit 6086 may set "delta_mcs" in the above formula for calculating the expected uplink transmission power level at a value reported via an RRC message. Also in the formula, "delta_i" may be set at a value reported via the uplink scheduling grant.

The downlink quality measuring unit 6087 receives the channel estimate and the downlink reference signal from the downlink reference signal receiving unit 6085, and receives the decoding results of the downlink data signal from the data signal decoding unit 6084.

Below, functions of the downlink quality measuring unit 6087 of this embodiment not included in the downlink quality measuring unit 6087 of the first embodiment are described.

The downlink quality measuring unit 6087 calculates an expected downlink throughput based on the downlink resource block allocation information, the data size, and the number of streams obtained from the downlink scheduling information in the data signal. For example, the downlink quality measuring unit 6087 calculates an expected throughput per resource block as follows:

Expected throughput[bits/second]=data size[bits]× 1000/number of resource blocks Here, it is assumed that one subframe is 1 ms and therefore the data size is multiplied by 1000.

As in the first embodiment, the expected downlink throughput may be represented by an average in the time domain and/or the frequency domain. Also, the expected downlink throughput may be represented by an average calculated based on positional information.

Instead of calculating an expected throughput per resource block as in the above example, an expected throughput may be calculated based on resource allocation information in the frequency domain and/or the time domain. For example, an expected throughput may be calculated based on the frequency (or the rate) at which the downlink scheduling information is actually transmitted and an actually-allocated transmission band, or based on an assumption that all frequency and time resources are allocated to the receiving apparatus 600. Further, an expected throughput may be calculated based on hypothetical frequency and time resources (allocation frequency) input from the outside via the external input/output unit 610.

The reference signal measuring unit 6089 of this embodiment is substantially the same as that of the first embodiment except the difference as described below.

For a downlink reference signal from the serving cell, i.e., the base station 200, and a neighboring base station, the reference signal measuring unit 6089 calculates a received power level of the downlink reference signal (reference signal received power (RSRP)), a downlink received carrier power level (E-UTRA carrier received signal strength indicator (RSSI)), a value obtained by dividing the received power level of the downlink reference signal by the downlink received carrier power level (RSRP/RSSI), and a path loss, and inputs the calculated values to the call processing unit 612.

The MAC processing unit 6091 receives the downlink scheduling information, the uplink scheduling grant, the acknowledgement information for an uplink shared channel, and the downlink shared channel from the data signal decoding unit 6084.

The MAC processing unit 6091, based on the uplink scheduling grant, performs transmission processing such as transport format determination and MAC-layer retransmission control (HARQ) for the uplink user data. Specifically, if transmission using an uplink shared channel is requested by the uplink scheduling grant received from the base station 200 via the data signal decoding unit 6084, the MAC processing unit 6091 performs transmission processing such as transport format determination and retransmission control (HARQ) for packet data in a data buffer of the receiving apparatus 600, and inputs the packet data to the signal generating unit 6093.

For downlink, the MAC processing unit 6091 performs, for example, reception processing in MAC-layer retransmission control for downlink packet data based on the downlink scheduling information from the data signal decoding unit 6084.

Also, the MAC processing unit 6091 may be configured to measure uplink and downlink MAC layer throughputs and to input the measured throughputs to the external input/output unit 610.

The MAC layer throughputs may be represented by averages in the time domain. An average in the time domain may be calculated over an averaging period defined as a parameter. For example, an average may be calculated over an averaging period of 1 s. Also, the average calculated over 1 s may be filtered using the following formula to obtain a value $F_n$:

$$F_n = (1-a) \times F_{n-1} + a \times M_n$$

where,
$F_n$: current value obtained by filtering
$F_{n-1}$: previous value obtained by filtering
a: filtering factor
$M_n$: average over 1 s For example, the filtering factor "a" may be set at $\frac{1}{2}^{(k/2)}$ (k=0, 1, 2, . . . ). The averaging period and the filtering factor "a" may be provided as parameters in the receiving apparatus 600 or may be input from the outside via the external input/output unit 610.

Instead of averaging throughputs in the time domain as described above, throughputs may be averaged based on positional information of the receiving apparatus 600. For example, MAC layer throughputs may be averaged over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

Also, the MAC processing unit 6091 may be configured to calculate a MAC layer throughput based on resource allocation information in the frequency domain and/or the time domain. That is, the MAC processing unit 6091 may calculate an actual MAC layer throughput or calculate a MAC layer throughput based on an assumption that all frequency and time resources are allocated to the receiving apparatus 600. Also, the MAC processing unit 6091 may calculate a MAC layer throughput based on hypothetical frequency and time resources (allocation frequency) input from the outside via the external input/output unit 610.

After calculations, the MAC processing unit 6091 inputs the calculated MAC layer throughputs to the external input/output unit 610.

The RLC (radio link control) processing unit 6092 performs, for uplink, RLC layer transmission processing such as segmentation/concatenation of packet data and transmission processing in RLC retransmission control, and performs, for downlink, RLC layer reception processing such as segmentation/concatenation of packet data and reception processing in RLC retransmission control. The RLC processing unit 6092 may be configured to perform PDCP layer processing in addition to the RLC layer processing described above.

Also, the RLC processing unit 6092 may be configured to measure uplink and downlink RLC layer throughputs and to input the measured throughputs to the external input/output unit 610.

The RLC layer throughputs may be represented by averages in the time domain.

An average in the time domain may be calculated over an averaging period defined as a parameter. For example, an average may be calculated over an averaging period of 1 s. Also, the average calculated over 1 s may be filtered using the following formula to obtain a value $F_n$:

$$F_n = (1-a) \times F_{n-1} + a \times M_n$$

where,
$F_n$: current value obtained by filtering
$F_{n-1}$: previous value obtained by filtering
a: filtering factor
$M_n$: average over 1 s For example, the filtering factor "a" may be set at $\frac{1}{2}^{(k/2)}$ (k=0, 1, 2, . . . ). The averaging period and the filtering factor "a" may be provided as parameters in the receiving apparatus 600 or may be input from the outside via the external input/output unit 610.

Instead of averaging throughputs in the time domain as described above, throughputs may be averaged based on positional information of the receiving apparatus 600. For example, RLC layer throughputs may be averaged over an averaging interval of 100 m, i.e., every 100-m movement of the receiving apparatus 600. A two-dimensional parameter such as 100 m² may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

Also, the RLC processing unit 6092 may be configured to calculate an RLC layer throughput based on resource allocation information in the frequency domain and/or the time domain. That is, the RLC processing unit 6091 may calculate an actual RLC layer throughput or calculate an RLC layer throughput based on an assumption that all frequency and time resources are allocated to the receiving apparatus 600. Also, the RLC processing unit 6092 may calculate an RLC layer throughput based on hypothetical frequency and time resources (allocation frequency) input from the outside via the external input/output unit 610.

After calculations, the RLC processing unit 6092 inputs the calculated RLC layer throughputs to the external input/output unit 610.

The signal generating unit 6093, for example, encodes and data-modulates an uplink shared channel, a sounding reference signal, and/or an uplink control channel such as downlink quality information and acknowledgement information for a downlink shared channel, and thereby generates an uplink transmission signal.

The transmission processing unit 6094 performs transmission processing such as DFT processing, IFFT processing, and CP addition.

The external input/output unit 610 outputs calculated (measured) values from the uplink quality measuring unit 6086, the downlink quality measuring unit 6087, the reference signal measuring unit 6089, the MAC processing unit 6091, and the RLC processing unit 6092 of the baseband signal processing unit 608, the call processing unit 612, and the application unit 614 to external interfaces. For example, the external input/output unit 610 displays the calculated values as numerical data and/or graphs on a monitor screen or stores the calculated values as numerical data in a storage medium such as a memory or a hard disk.

The external input/output unit 610 also receives information regarding a serving cell at a given timing from the call processing unit 612. The external input/output unit 610 may output the calculated values to an external interface (e.g., a monitor screen or a storage medium) together with the information regarding the serving cell.

Also, the external input/output unit 610 may obtain positional information of the receiving apparatus 600 and output calculated (measured) values from the uplink quality measuring unit 6086, the downlink quality measuring unit 6087, and the reference signal measuring unit 6089 to an external interface (e.g., a monitor screen or a storage medium) together with the positional information. The positional information may be obtained, for example, from a positional information obtaining device such as the GPS 700 connected to the external input/output unit 610.

When output together with the positional information, the calculated (measured) values from the uplink quality measuring unit 6086, the downlink quality measuring unit 6087, the reference signal measuring unit 6089, the MAC processing unit 6091, the RLC processing unit 6092, and the application unit 614 may be represented by averages in the time domain or averages calculated based on the positional information.

Also, when the calculated values are averaged based on the positional information instead of in the time domain by the uplink quality measuring unit 6086, the downlink quality measuring unit 6087, the reference signal measuring unit 6089, the MAC processing unit 6091, the RLC processing unit 6092, and the application unit 614, the positional information obtained from the GPS 700 is input via the external input/output unit 610 to the corresponding units.

The external input/output unit 610 may also be configured to store parameters used by the uplink quality measuring unit 6086, the downlink quality measuring unit 6087, the reference signal measuring unit 6089, the MAC processing unit 6091, and the RLC processing unit 6092 of the baseband signal processing unit 608 and the application unit 614, and to input the parameters to the corresponding units. The parameters may be stored as internal parameters of the receiving apparatus 600 or may be input from an external interface.

The call processing unit 612 performs call processing such as establishment, handover, and release of communication channels, and status management of the receiving apparatus 600.

The call processing unit 612 also receives calculated (measured) values regarding a downlink reference signal transmitted from the serving cell, i.e., the base station 200, and a neighboring base station from the reference signal measuring unit 6089 of the baseband signal processing unit 608, generates a measurement report based on the downlink reference signal, and transmits the measurement report via the baseband signal processing unit 608, the transceiver unit 606, the amplifier 604, and the antenna 602 to the base station 200.

The call processing unit 612 also outputs the contents of the measurement report to the external input/output unit 610. The contents of the measurement report input to the external input/output unit 610 are output, for example, as graphs or numerical data to the outside (e.g., a monitor screen or a storage medium) as described later. Also, contents of the measurement report may be output as graphs or numerical data to the outside (e.g., a monitor screen or a storage medium) together with the positional information of the receiving apparatus 600. Thus, the contents of the measurement report are output to the outside to allow a network operator (or a user, a device, or so on) to determine whether the quality of handover is appropriately maintained and to optimize parameters related to handover such as handover hysteresis and "time to trigger".

Also, the call processing unit 612 reports, for example, information on the current serving cell to the components of the baseband signal processing unit 608 and the external input/output unit 610.

The application unit 614 performs processing regarding upper layers higher than the physical layer, the MAC layer, and the RLC layer.

The application unit 614 uploads and downloads files to and from a server to enable the receiving apparatus 600 to continue communications with the base station 200.

The application unit 614 may also be configured to measure uplink and downlink TCP layer throughputs and to input the measured throughputs to the external input/output unit 610.

The TCP layer throughputs may be represented by averages in the time domain. An average in the time domain may be calculated over an averaging period defined as a parameter. For example, an average may be calculated over an averaging period of 1 s. Also, the average calculated over 1 s may be filtered using the following formula to obtain a value $F_n$:

$$F_n = (1-a) \times F_{n-1} + a \times M_n$$

where,
$F_n$: current value obtained by filtering
$F_{n-1}$: previous value obtained by filtering
a: filtering factor
$M_n$: average over 1 s For example, the filtering factor "a" may be set at $\frac{1}{2}^{(k/2)}$ (k=0, 1, 2, ... ). The averaging period and the filtering factor "a" may be provided as parameters in the receiving apparatus 600 or may be input from the outside via the external input/output unit 110.

Instead of averaging throughputs in the time domain as described above, throughputs may be averaged based on positional information of the receiving apparatus 600. For example, TCP layer throughputs may be averaged over an averaging interval of 100 m, i.e., every 100-m movement of the receiving apparatus 600. A two-dimensional parameter such as 100 $m^2$ may be specified for the averaging interval instead of a one-dimensional parameter such as 100 m. The positional information is input via the external input/output unit 610. The averaging interval based on the positional information may be provided as a parameter in the receiving apparatus 600 or may be input from the outside via the external input/output unit 610.

Also, the application unit 614 may be configured to calculate a TCP layer throughput based on resource allocation information in the frequency domain and/or the time domain. That is, the application unit 614 may calculate an actual TCP layer throughput or calculate a TCP layer throughput based on an assumption that all frequency and time resources are allocated to the receiving apparatus 600. Also, the application unit 614 may calculate a TCP layer throughput based on hypothetical frequency and time resources (allocation frequency) input from the outside via the external input/output unit 610.

Further, the application unit 614 may be configured to obtain dump data of the TCP layer and to obtain data regarding temporal change in the TCP sequence number, duplicate ACK, and TCP retransmission from the dump data.

The application unit 614 inputs the uplink and downlink TCP layer throughputs and the obtained data regarding temporal change in the TCP sequence number, duplicate ACK, and TCP retransmission to the external input/output unit 610.

Fourth Embodiment

A receiving apparatus 600 for communication area evaluation according to a fourth embodiment of the present invention is different from the receiving apparatuses of the above embodiments in that it includes multiple receiving units having different receiving capabilities. Here, "receiving capability" is defined, for example, by the number of receiving antennas, a distance between multiple receiving antennas, a difference in antenna gain between multiple receiving antennas, a receiving algorithm, and/or a signal separation algorithm in MIMO.

The receiving apparatus 600 of this embodiment has a configuration similar to that shown in FIG. 5 or FIG. 18, but includes multiple baseband signal processing units having different receiving capabilities. Each of the baseband signal processing units, for example, includes an uplink quality measuring unit 6086, a downlink quality measuring unit 6087, a delay profile measuring unit 6088, a reference signal measuring unit 6089, and an error rate obtaining unit 6090; and calculates and outputs uplink quality, downlink quality, a delay profile, a reference signal measurement, and an error rate corresponding to its receiving capability. In other words, the baseband signal processing units output multiple sets of calculation results. Also in this case, each of the baseband signal processing units may be configured to obtain positional information of the receiving apparatus 600 and to output uplink quality, downlink quality, a delay profile, a reference signal measurement, and an error rate in association with the positional information.

A receiving apparatus including multiple baseband signal processing units with different receiving capabilities makes it possible to simultaneously evaluate communication qualities for different receiving capabilities and thereby makes it possible to determine effective differences between the receiving capabilities. Also, it is possible to provide a highly-efficient communication system by designing a service (or communication) area based on such evaluation results.

In the above embodiments, it is assumed that the radio communication system 1000 is based on Evolved UTRA and UTRAN (also called Long Term Evolution or Super 3G). However, a mobile station, a base station, a mobile communication system, and a communication control method according to aspects of the present invention may be used for any system using shared channels for communications. For example, the present invention may also be applied to W-CDMA and HSDPA in 3GPP and 1xEV-DO and UMB in 3GPP2.

Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-211590 filed on Aug. 14, 2007, the entire contents of which are hereby incorporated herein by reference.

The invention claimed is:

1. A receiving apparatus, comprising:
   a receiving unit configured to receive a first signal transmitted from a base station;
   a first calculation unit configured to calculate, based on the first signal, a received power level of the first signal, a downlink received power level, a value obtained by dividing the received power level of the first signal by the downlink received power level, and a path loss, which are for an entire frequency band of a mobile communication system;
   a second calculation unit configured to calculate, based on the first signal, a received power level of the first signal, a downlink received power level, a value obtained by dividing the received power level of the first signal by the downlink received power level, and a path loss, which are for a part of the entire frequency band of the mobile communication system; and
   an outputting unit configured to output the received power level of the first signal, the downlink received power level, the value obtained by dividing the received power level of the first signal by the downlink received power level, and the path loss calculated by each of the first calculation unit and the second calculation unit.

2. The receiving apparatus as claimed in claim 1, wherein the part of the entire frequency band of the mobile communication system is a frequency band of 1.08 MHz including a center frequency of the entire frequency band.

3. The receiving apparatus as claimed in claim 1, wherein the first signal is a downlink reference signal or a common pilot channel.

4. The receiving apparatus as claimed in claim 1, wherein
   the receiving unit comprises a plurality of receiving units having different receiving capabilities; and
   the outputting unit is configured to output multiple calculation results corresponding to the receiving units.

5. The receiving apparatus as claimed in claim 4, wherein the receiving capabilities are defined by a number of receiving antennas, a distance between multiple receiving antennas, a difference in antenna gain between multiple receiving antennas, a receiving algorithm, and/or a signal separation algorithm in MIMO.

6. The receiving apparatus as claimed in claim 1, further comprising:
   a positional information obtaining unit configured to obtain positional information of the receiving apparatus, wherein the outputting unit is configured to output the received power level of the first signal, the downlink received power level, the value obtained by dividing the received power level of the first signal by the downlink received power level, and the path loss calculated by each of the first calculation unit and the second calculation unit, in association with the positional information.

7. A data obtaining method, comprising:
   a receiving step of receiving a first signal transmitted from a base station;
   a first calculation step of calculating, based on the first signal, a received power level of the first signal, a downlink received power level, a value obtained by dividing the received power level of the first signal by the downlink received power level, and a path loss for an entire frequency band of a mobile communication system;
   a second calculation step of calculating, based on the first signal, the received power level of the first signal, the downlink received power level, the value obtained by dividing the received power level of the first signal by the downlink received power level, and the path loss for a part of the entire frequency band of the mobile communication system; and
   an output step of outputting the received power level of the first signal, the downlink received power level, the value obtained by dividing the received power level of the first signal by the downlink received power level, and the path loss calculated by each of the first calculation step and the second calculation step.

* * * * *